United States Patent [19]

Kurematsu et al.

[11] Patent Number: 4,959,122
[45] Date of Patent: Sep. 25, 1990

[54] APPARATUS FOR TREATING PHOTOGRAPHIC PROCESS WASTE LIQUOR

[75] Inventors: Masayuki Kurematsu; Shigeharu Koboshi; Nobutaka Goto; Naoki Takabayashi, all of Hino, Japan

[73] Assignee: Konica Corporation, Tokyo, Japan

[21] Appl. No.: 262,965

[22] Filed: Oct. 26, 1988

[30] Foreign Application Priority Data

| Nov. 1, 1987 | [JP] | Japan | 62-276414 |
| Nov. 29, 1987 | [JP] | Japan | 62-301363 |
| Nov. 29, 1987 | [JP] | Japan | 62-301364 |

[51] Int. Cl.$^5$ .................... B01D 1/00; B01D 35/00
[52] U.S. Cl. .................... 159/42; 159/43.1; 159/47.3; 159/901; 159/DIG. 23; 210/195.1; 210/360.1; 210/78.1; 354/324
[58] Field of Search .............. 159/42, 31, 901, 43.1, 159/DIG. 23, 47.3; 210/781, 195.1, 196, 197, 360.1; 354/324

[56] References Cited

U.S. PATENT DOCUMENTS

| 442,478 | 12/1890 | Brower | 159/42 |
| 1,488,862 | 4/1924 | Burchenal | 210/195.1 |
| 1,767,399 | 6/1930 | Reiling | 159/DIG. 23 |
| 2,091,898 | 8/1937 | Weber | 159/901 |
| 2,182,428 | 12/1939 | Fladmark | 159/42 |
| 2,350,934 | 6/1944 | Schutte | 159/42 |
| 2,567,968 | 9/1951 | Salman | 159/901 |
| 3,554,800 | 1/1971 | Vauet et al. | 159/901 |
| 3,995,298 | 11/1976 | Vandeputte et al. | 354/324 |
| 4,073,705 | 2/1978 | Torikai et al. | 204/92 |
| 4,735,728 | 4/1988 | Wemhoff | 159/47.3 |
| 4,778,605 | 10/1988 | Anthoney et al. | 159/901 |

FOREIGN PATENT DOCUMENTS 0270358 6/1988 European Pat. Off. .
1497873 1/1978 United Kingdom .

OTHER PUBLICATIONS

Patent Abstracts of Japan, vol. 11, No. 335, (p-632) [2782], Nov. 4th, 1987, p. 67, P 632; & JP-A-62 118 346, (Konishiroku Photo Ind. Co. Ltd.), 29-05-1987.

*Primary Examiner*—Virginia Manoharan
*Attorney, Agent, or Firm*—Frishauf, Holtz, Goodman & Woodward

[57] ABSTRACT

An apparatus for treating a photographic process waste liquor in which the photographic process waste liquor stored in an evaporating device is heated and concentrated by evaporation with use of a heating device provided in the evaporating device, in that the evaporating device is provided with a precipitate separating device capable of separating a precipitate generated in a concentrated liquid to be formed through concentration by evaporation; a circulation system to feed again the concentrated liquid to the evaporating device through the precipitate separating device; and a discharging device for discharging the precipitate separated at the precipitate separating device.

By use of the apparatus for treating photographic process waste liquor, thermal decomposition of the precipitate generated by concentration by evaporation of the photographic process waste liquor and generation of bad odor can be inhibited.

9 Claims, 19 Drawing Sheets

APPARATUS FOR TREATING PHOTOGRAPHIC PROCESS WASTE LIQUOR

BACKGROUND OF THE INVENTION

This invention relates to an apparatus for treating waste liquor produced concomitantly with development processing of light-sensitive photographic materials using an automatic processing machine for photography (hereinafter abridged as "photographic process waste liquor" or "waste liquor") through concentration by evaporation, and, more particularly, to an apparatus for treating photographic process waste liquor through concentration by evaporation, that is suited for treating the waste liquor by installing the apparatus inside the automatic processing machine or in the vicinity thereof.

In general, the photographic processing of light-sensitive silver halide photographic materials is carried out by combining steps employing processing solutions having one or more of the functions such as developing, fixing, water washing, etc. in the case of black and white light-sensitive photographic materials. In the case of light-sensitive color photographic material, processing includes color developing, bleach-fixing (or bleaching and fixing), water washing, stabilizing, etc.

Then, in the photographic processing to process a large quantity of light-sensitive materials, there is employed a means by which the performance of processing solutions is constantly maintained by removing (while replenishing components consumed by the processing) components that may be thickened or concentrated during the processing by dissolving-out in the processing solution or by evaporation (for example, bromide ions in the developing solution, silver complex salts in the fixing solution, etc.). A replenishing solution or replenisher is supplied to the processing solution for the purpose of the above replenishing, and a part of the processing solution is thrown away for the purpose of removing the above thickened or concentrated components in the photographic processing.

Recent years, because of environmental pollution or for economical reasons, replenishing solutions for photographic development processing solutions as well as washing water which is a replenishing solution for washing are undergoing a change such that they are used in a system in which the quantity of the replenishment has been greatly decreased. The photographic process waste liquor, however, is led from a processing tank of the automatic processing machine through a waste liquor pipe and thrown away in sewerages or the like after being diluted with waste liquor of washing water or cooling water for the automatic processing machine.

However, because of tightened regulation in recent years against environmental pollution, although it is possible to throw away washing water or cooling water in sewers or rivers, it has been made substantially impossible to throw away the photographic processing solutions other than those [for example, developing solutions, fixing solutions, color-developing solutions, bleach-fixing solutions (or bleaching solutions or fixing solutions), stabilizing solutions, etc.]. For this reason, every photographic processing dealer has the waste liquor collected by dealers specialized in the waste liquor treatment by paying collecting fee, or installs equipment for pollution-preventive treatment. Such way of placing the waste liquor treatment to dealers' care may require a considerable space for keeping the waste liquor stored and may also be very expensive from the viewpoint of cost. Also, the equipment for pollution-preventive treatment may involve disadvantages such that it requires a very large initial investment (or initial cost) and a considerably large space for the equipment. Accordingly, in general, the waste liquor is collected by waste liquor collecting dealers, and made harmless after secondary and tertiary treatments. However, because of an increase in the cost for the collection, not only the fees for taking over the waste liquor is increasing year by year, but also the dealers are not willing to come to collect the waste liquor to miniature photofinishing laboratories because of its low collection efficiency, thus causing problems such that shops are full of waste liquor.

For the purpose of solving these problems and with an aim of making it possible to readily carry out the treatment of the photographic process waste liquor also in the miniature photofinishing laboratories, it has been researched to heat the photographic process waste liquor to carry out evaporation of water to dryness or effect solidification as disclosed, for example, in Japanese Utility Model Unexamined Publication No. 70841/1985.

Incidentally, in the case where the photographic process waste liquor is treated by evaporation, harmful or remarkably ill-smelling gas such as sulfur dioxide, hydrosulfide and ammonia gas are generated. This is caused by decomposition of sulfur series compounds used for or particular to the fixing solution and bleach-fixing solution contained in the photographic process waste liquor, for example, thiosulfates, sulfites, etc.

SUMMARY OF THE INVENTION

Under such circumstances, the present inventors conducted various researchers and experiments for the purpose of removing the ill-smelling components, and discovered that, if a precipitate generated by concentration by evaporation of the photographic process waste liquor remains in the vicinity of the heating means in the evaporating means for a long period and is heated continuously, the precipitate is decomposed by the excess heating, resulting in generation of hydrogen sulfide, ammonia gas, etc. Accordingly, it may be considered that an absorption facility or an elimination facility for the ill-smelling gas generated should be provided. However, since it involves a disadvantage that cost becomes high, it is rather important to reduce the generation of the ill-smelling gas. For this reason, the present inventors found out that the generation of ill-smelling gas such as hydrogen sulfide, ammonia gas, etc. will be greatly inhibited by preventing the thermal decomposition of precipitates which had been concentrated, if the precipitates are taken out from the evaporating means in the course of processing to discharge the further denser precipitate.

This invention has been made in an attempt to solve the above problems, and an object of this invention is to provide an apparatus for treating photographic process waste liquor that can prevent thermal decomposition of the precipitate generated by concentration by evaporation of the photographic process waste liquor and inhibit generation of bad odor.

This invention has been made for the purpose of solving the problems mentioned above, and it relates to an apparatus for treating photographic process waste liquor in which the photographic process waste liquor stored in an evaporating means is heated and concentrated by evaporation with use of a heating means provided in the evaporating means, characterized in that the evaporating means is composed of a precipitate separating means capable of separating the precipitate generated in the concentrated liquid obtained through concentration by evaporation; a circulation system to circulate the concentrates to the evaporating means through the precipitate separating means and a discharging means for discharging the precipitate separated at the precipitate separating means.

Preferred embodiment of this invention resides in that the above precipitate separating means is a precipitating tank having obstacles therein.

The other preferred embodiment of this invention resides in that, in the apparatus for treating photographic process waste liquor, the evaporating means is provided with a taking-out or outlet section whose sectional area becomes successively smaller (hereinafter sometimes called as a taper-shaped section or a taper-shaped taking-out section), the concentrated liquid generated by concentration by evaporation is taken out therefrom and the concentrate thus taken is conveyed to the precipitate separating means. The taking-out section is provided such that the precipitate can be obtained extremely rapidly from the concentrated liquid generated by concentration by evaporation for enabling immediate and secure removal of the precipitate from the evaporating means so that the precipitate may not excessively be heated therein.

DESCRIPTION OF THE PREFERRED EMBODIMENTS

Figure 1:
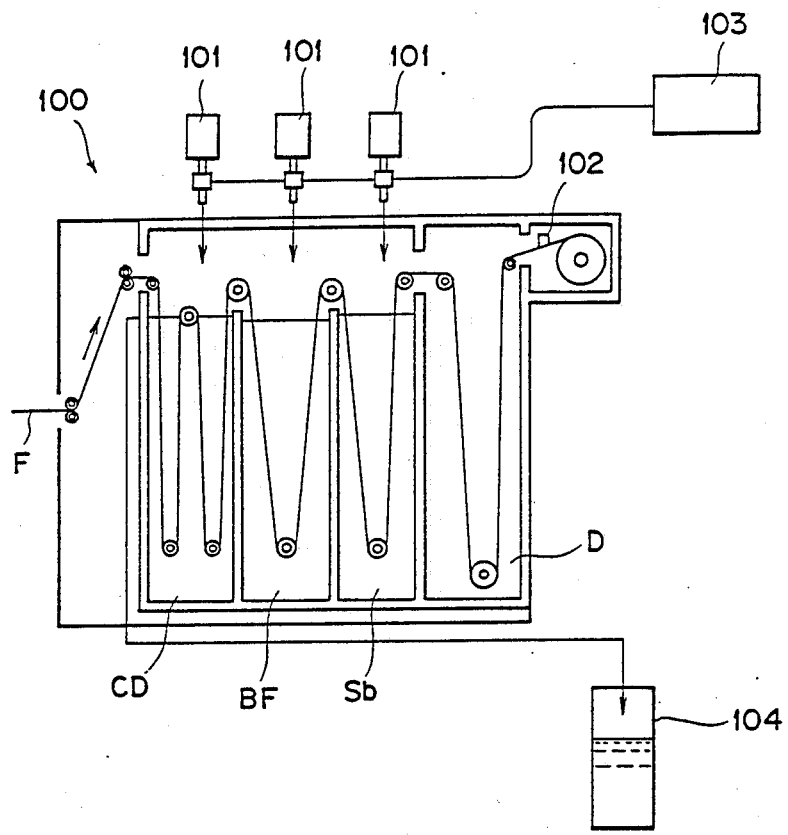
FIG. 1 is a schematical view of an automatic processing machine.

In the present apparatus for treating photographic process waste liquor, the photographic process waste liquor is heated by the heating means to concentrate by evaporation, and the precipitate generated thereby is forcedly taken out from the evaporating means to the side of the precipitate separating means of a circulation system by actuation of a pump, etc. The precipitate is separated as a further denser precipitate by the precipitate separating means to be discharged, whereas the remaining waste liquor is recovered to the section of the evaporating means to effect circulation. In this connection, the precipitate generated through the concentration by evaporation does not stay in the vicinity of the heating means, but they are taken out from the evaporating means to be separated and discharged in the circulating system. Accordingly, heating of the precipitate is reduced, resulting in preventing of thermal decomposition of the precipitate having been concentrated and which is the source of generating ill-smelling gas.

The precipitate separating means of this invention may be consituted so that the lower limit of diameter of the precipitates which can be removed by the filter is 1 to 200 μm, preferably the lower limit of the precipitates is 5 μm or more.

The precipitate to be generated through concentration by evaporation of the photographic process waste liquor may preferably be taken out through the precipitate separating means, and such precipitate separating means may preferably be constituted by a pressure filtration means and/or centrifugal filtration means. The precipitate separating means may include a filter as an example, and such a filter may preferably have a diameter of the opening of 1 to 200 μm.

In this case, the precipitate can be forced absorbed through such filter by means of a circulation pump. In such case, since the adhesive components adhered onto the filter is removed by forced aspiration and further viscosity of the precipitate becomes lower by use of a cylindrical filter, filter bag, etc., burden of the filter can be reduced, resulting in filtration of a large amount of precipitates without causing cloggings.

In the case where the centrifugal filtration means is used, the clogging to be caused by the precipitates can be further reduced, the filtration can be far more securely, and the liquid does not drop when taken out, favorably.

In the circulation system, the photographic process waste liquor is concentrated by evaporation in the evaporating means and the resulting condensed liquor of higher concentration containing the precipitate is taken out from the lower portion of the evaporating means and the precipitate is recovered to the upper portion from the viewpoint of ease in taking out and circulation. Further, a waste liquor feeding tank may preferably be installed in the step posterior to the precipitate separating means for making it possible to circulate the waste liquor to the evaporating means through the waste liquor feeding tank.

According to the preferred embodiment of this invention, if a precipitating tank having an obstacle therein is used as the precipitate separating means, the photographic process waste liquor is heated in the heating means to concentrate by evaporation and the concentrated liquid produced thereby is led to the precipitating tank. Then, particles in the concentrate collide with the obstacle and drop to remain as precipitate, whereas the nondropped particles are separated and recovered to the evaporating means with a passing liquor. The thus generated precipitates through concentration by evaporation are taken out from the evaporating means together with the concentrated liquid and they are discharged after being separated efficiently in the precipitating tank. For this reason, the waste liquor may not stay in the vicinity of the heating means to inhibit decomposition by excess heating of the concentrated precipitates which is the source of generating ill-smelling gas.

The obstacles to be provided in the precipitating tank according to this invention may include any shape of thread, plate, sphere, cloth, etc. However, the shape is not critical. In addition, there may be included those prepared by filling a large quantity of small pieces, or forming a baffled path or, so-called baffle plate, with plural plates, etc.

The obstacles mentioned above may be made of materials such as organic polymeric compounds (e.g. nylon, polyester, polyethylene, tetron, polypropylene, vinyl chloride, etc.), cotton, wool, metals (e.g. stainless steel, iron, aluminum, copper, etc.), glass, ceramics and the like. However, they may be made of any materials, if no change in their shapes may be caused by the waste liquor or temperature thereof and they can be used as obstacles for the precipitate. The small pieces to be used as the obstacles may include fillers ordinarily used and may have any shape of tube, sphere, star, etc., and also may have a hollow structure.

The apparatus of this invention may preferably be constituted so that the concentrated liquid is fed horizontally to the precipitating tank, and the passing liquid from the precipitating tank is taken out horizontally from the precipitating tank, thereby the concentrated liquid may securely be made to collide with the obstacles. Further, when the precipitate deposited in the precipitating tank are taken out, they are preferably taken out from upper or lower section of the precipitating tank from the viewpoint of ease in taking-out, because no disturbance will be found in such case.

According to another preferred embodiment of this invention, in the case of providing a taking-out section whose sectional area becomes successively smaller in the evaporating means, the photographic process waste liquor is heated by the heating means to effect concentration by evaporation, and the resulting concentrated liquid is cooled at the taking-out section having a smaller sectional area in the evaporating means and then the separation of the precipitate from the concentrated liquid is accelerated. Moreover, the thus obtained precipitates are guided to the taking-out section together with the concentrated liquid to be discharged smoothly and securely. By virtue of such taking-out of the concentrated liquid, deposition of the precipitate at the taking-out section may be reduced, and the precipitate is further separated as those of higher concentration in the precipitate separating means to be discharged, whereas the remaining concentrated liquid is recovered to the evaporating means to effect circulation.

As described above, since the concentrated liquid produced through concentration by evaporation is cooled by the above construction, the precipitates can be obtained extremely rapidly. Further, the precipitates are taken out rapidly and securely in the evaporating means and they are separated and discharged in the circulation system. Accordingly, thermal decomposition of the concentrated precipitates, which is the source of ill-smelling gas, can be inhibited.

In this embodiment, a means for cooling the taking-out section of the evaporating means may preferably be installed, and for example it may be done with a cooling fan, etc. Further, if the taking-out section of the evaporating means is cooled by heat-exchanging with the photographic process waste liquor to be fed to the evaporating means, no special cooling means is required and the photographic process waste liquor can preferably be preheated.

The heating means to be installed in the evaporating means may comprise a nickrome wire, or may include worked-up heaters such as a cartridge heater, a quartz heater, a Teflon heater, a rod heater and a panel heater or may be a heating means by using micro wave. Alternatively, the heating means of this invention may be provided so as to bring a conductive material into contact directly with the photographic process waste liquor, and to make a current to flow in the photographic process waste liquor by use of the conductive material to heat it, thereby generation of ill-smelling to be produced at the concentration by evaporation can be inhibited. Also preferred is a heater which employs the compositions of an electro-conductive material simply as a resistant material and insulates from the photographic process waste liquor. Further, ceramic heaters and the like can be employed.

The heating means may preferably be constituted so that it is dipped wholly or partially in the photographic process waste liquor to conduct evaporation of the photographic process waste liquor thereby for enhancing the waste liquor treating efficiency (processing speed). In this case, the heating temperature is preferably 80° to 130° C.

The evaporating means used in this invention may be of any shape, and may be in the shape of a cube, a column, a polygonal pillar including a square pillar, a cone, a polygonal pyramid including a quadrangular pyramid, or a combination of some of these, but may preferably be long in the longitudinal direction so that the difference between the temperature in the vicinity of the heating means and the temperature of the photographic process waste liquor at the bottom part may be made greater. More preferably, the space upper than the surface of the waste liquor in the evaporation vessel may be made as great as possible so as to lessen as far as possible the above-mentioned accidental blowing-off or spouting to be caused by the bumping.

The evaporation vessel may be made of any materials if they are heat-resistant materials such as heat-resistant glass, titanium, stainless steel, carbon steel, and heat-resistant plastic. However, from the viewpoints of the safety and corrosion resistance, preferred are stainless steel (preferably SUS 304 or SUS 316) and titanium.

The heating means may be provided in the evaporating means so that it may heat the photographic processing waste liquor to about 80° to 130° C., and it may be provided in a waste liquor but, it is also preferable to provide it outside the evaporating means and heat the waste liquor in the evaporation vessel through the wall of the evaporation vessel. The heating means may be provided at any position so long as it is possible to heat the waste liquor in the evaporating means. However, as described in Japanese Patent Application No. 288328/1986, the heating means may preferably be provided such that the upper part of the photographic process waste liquor in the evaporating means can be heated.

In this invention, there may be provided a condensing means for cooling and condensing the vapor formed, and as the condensing means, all sorts of heat exchanging means can be employed.

This condensing means is preferably constituted as a heat dissipation device provided with a heat dissipation plate (or an air-cooling fun) on a vapor discharge pipe for discharging the vapor formed by evaporation, and has a means for feeding water on this heat dissipation plate. In this instance, water may preferably be fed on the heat dissipation plate from an upper part of a device comprising the heat dissipation plate in a shower form. The water may be fed, for example, from a faucet of city water on the heat dissipation plate through a valve or electromagnetic valve if necessary. In this instance, the means for feeding water refers to a faucet of city water, a water feeding pipe, etc. However, preferred is to use stored water, which may preferably be fed on the heat dissipation plate through a water-feeding means including constant rate pumps or non-constant rate pumps as described above. Particularly preferred is to constitute the mesns so that the stored water may be circulated in such a manner that the water in a stored water tank provided at a lower prt of the heat dissipation plate device may be fed in a shower form on the heat dissipation plate through a pump and again stored in the stored water tank at the lower part. In this instance, desired is that a liquid level sensor is provided in the stored water tank so that the short of the stored water can be detected by sending a signal when the liquid level become lower than a given level, and the water is again fed.

The condensing means may preferably be constituted as the heat dissipation plate device provided with the heat dissipation plate (or air cooling fun) on the vapor discharge pipe for discharging the vapor formed by evaporation, and, when there is provided the means for feeding water on this heat dissipation plate, it is preferably simultaneously provided with a fan for air cooling. However, in this instance, particularly preferred is that the fan for air cooling is provided in the manner that the air can be discharged outside the concentration-by-evaporation treatment apparatus of this invention through the heat dissipation plate device, as it is thereby possible to prevent the condensation from occurring in electric equipment sections in the concentration-by-evaporation treatment apparatus of this invention.

The condensate water obtained by cooling and condensing the vapor formed by evaporation is stored in a tank for storing the condensate water (i.e., a stored liquid tank). This stored liquid tank may preferably be provided in the inside of the concentration-by-evaporation treatment apparatus of this invention as the space can be thereby saved, and, in this instance, the stored liquid tank may preferably be placed on a pedestral capable of being pulled out, for the purpose of improving the workability.

Further, the constitutions of the evaporating means, the heating means and the condensing means of this invention are described in detail in Japanese Patent Applications No. 69435/1987, No. 69436/1987 and No. 69437/1987.

Further, preferred is to provide an adsorbing column in which at least a part of gas generated by evaporation of the photographic process waste liquor of this invention is brought into contact with an adsorbent. That is, the generation of the odor can more steadily be suppressed by bringing odor components generated in a trace amount into contact with the adsorbent to adsorb and remove it. Moreover, the gass having been subjected to being into contact with the adsorbent may be recovered to the means for concentrating by evaporation. However, by recovering the gas between a means for concentrating by evaporation and a means for obtaining condensate water so as to circulate, penetration of the cooled gas into the means for condensing by evaporation can preferably be prevented, resulting in an improvement in heat efficiency.

Further, the gas passed through the means for obtaining condensate water may be recovered after direct contact with the adsorbent, or may be brought into contact with through the stored liquid tank. Also, the gas having been in contact with the adsorbent may preferably be forcedly recovered by use of a means such as pump to circulate.

Next, typical examples of the photographic processing waste liquors to be treated according to this invention may include those described in the specification of Japanese Patent Application No. 194615/1987, etc. filed by the present applicant, and the apparatus for treating photographic process waste liquor of this invention is particularly effectively applied to the cases where the photographic process waste liquor containing a large amount of thiosulfate, sulfite, ammonium salt, and is extremely effectively used for treating those containing organic acid ferric complex salts and thiosulfates.

As a preferred example of applying this invention, this invention is suited for an instance in which the photographic process waste liquor produced concomitantly with the development processing of light-sensitive photographic materials by use of an automatic processing machine is treated inside the automatic processing machine or in the vicinity thereof. The automatic processing machine and the photographic process waste liquor will be described hereinbelow.

Automatic processing machine

In FIG. 1, the automatic processing machine is denoted by the numeral 100. The automatic processing machine shown therein is of a system in which a rolled light-sensitive photographic material F is continuously guided to a color developing tank CD, a bleach-fixing tank BF and a stabilizing tank Sb to effect photographic processing, and rolled up after drying D. The numeral 101 denotes replenishing solution tanks. The photographic processing amount of the light-sensitive photographic material F is detected by a sensor 102, and replenishing solutions are supplied in the respective processing tanks through a controlling device 103 according to the detected information.

Once the replenishing solutions are supplied to the respective photographic procesing tank, overflowed waste liquor is discharged from the processing tanks and collected in a stock tank 104. As a means for moving the overflowed photographic process waste liquor to the stock tank 104, a simple method is to allow it to naturally drop through a guide tube. In some instance, it can be forcedly transported by means of a pump or the like.

Also, as described above, components are different in the photographic process waste liquor in each of the photographic processing tanks CD, BF and Sb, but it is preferred to carry out the treatment at one time by mixing all the photographic process waste liquors.

Figure 2:
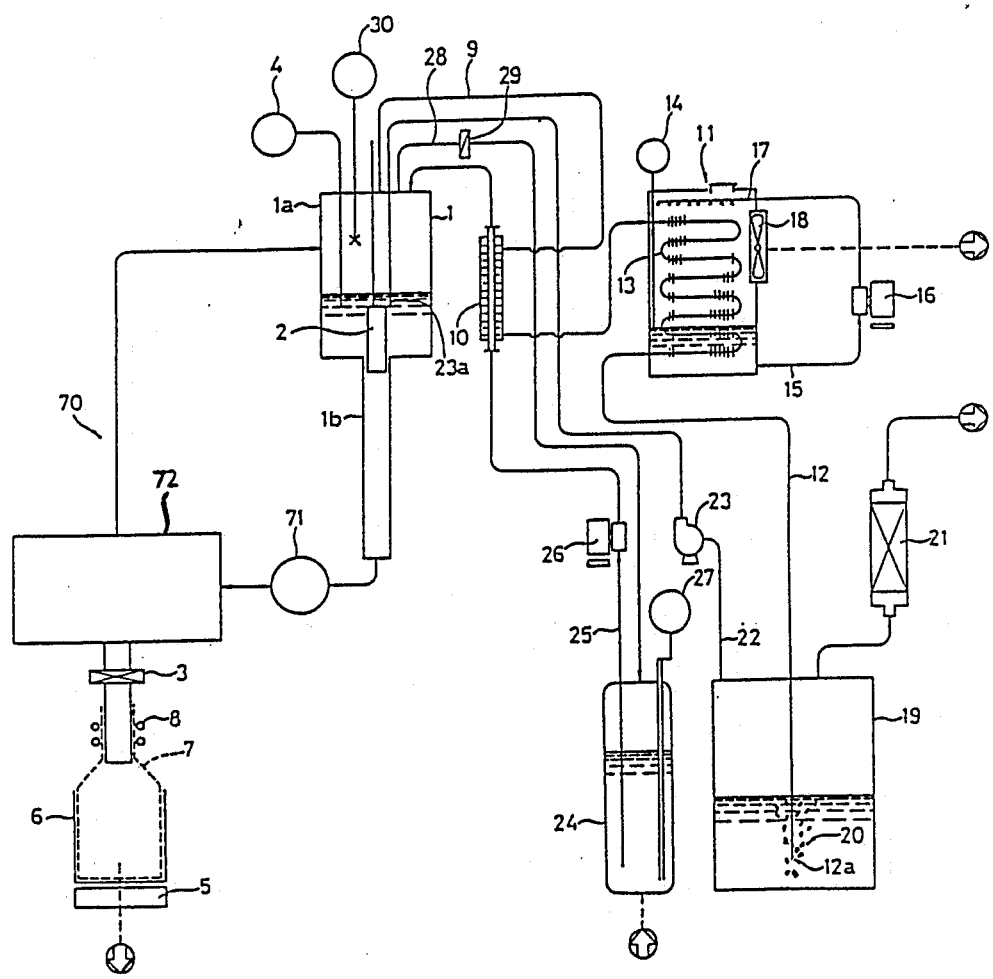
FIGS. 2 to 14, and FIGS. 19 to 26 are schematical constitutional views showing the examples of this invention.

FIG. 2 is a schematic constitutional illustration showing the apparatus of this invention, for treating the photographic process waste liquor.

In the figure, the numeral 1 denotes an evaporation vessel as an evaporating means, composed of a cylindrical upper section 1a having a larger diameter and a cylindrical lower section 1b having a smaller diameter, and provided at the upper section 1a with a heating means 2. A valve 3 is provided at a lower part of the evaporation vessel 1, and a liquid level sensor 4 is provided to the evaporation vessel 1 and further a circulation system 70 is provided to the lower section 1b and the upper section 1a of the evaporation vessel 1. A pump 71 and a precipitate separating means 72 are provided to the circulation system 70, and precipitate is taken out from the bottom portion of the lower sction 1b of the evaporation vessel 1 to be fed to the precipitate separating means 72. The precipitate separating means 72 is composed of a pressure filtration means and the precipitate is separated as the further denser precipitate and discharged. The remaining water content is recovered to the upper section 1a of the evaporation vessel 1.

At the lower part of the precipitate separating means 72, a sludge receptacle 6 is mounted on a pedestral 5. Inside the sludge receptacle 6, a bag 7 made of polypropylene is fixed by means of o-rings 8, and the precipitate separated are discharged. Further, on the upper section 1a of the evaporation vessel 1, provided is a vapor discharging pipe 9, and this vapor discharging pipe 9 is connected to a stored liquid lead-in pipe 12 through a heat exchanger 10 and a condensing means 11.

In the condensing means 11, a large number of a cooling heat-dissipation plates 13 are provided on the vapor discharging pipe 9 and a liquid level sensor 14 is further provided. At a lower part of the condensing means 11, a cooling water lead-in pipe 15 is provided, and connected through a cooling water circulating pump 16 to a shower pipe 17 bored with a large number of small holes.

The air inside the condensing means 11 is released outside the treatment apparatus by means of an air-cooling fan 18. The stored liquid lead-in pipe 12 is connected to a stored liquid tank 19, provided that a terminal end 12a of the stored liquid lead-in pipe 12 is positioned below the stored liquid surface to constitute a bubbling system 20. Further, an activated charcoal cartridge 21 housing activated charcoal is provided on an upper section of the stored liquid tank 19. In the stored liquid tank 19, also provided is an air lead-in pipe 22, whose terminal end 22a is introduced in the waste liquor in the evaporation vessel 1 though an air pump 23. The numeral 24 denotes a waste liquor feeding tank, provided with a waste liquor lead-in pipe 25 and connected to the upper section 1a of the evaporation vessel through a bellows pump 26 and the heat exchanger 10. On the waste liquor feeding tank 24, also provided is a liquid level sensor 27.

Further provided on the upper section 1a of the evaporation vessel 1 is a guide pipe 28, which is connected to the waste liquor feeding tank 24 through a plunger disc 29, and a temperature sensor 30 is also provided on the upper section 1a of this evaporation vessel 1.

Next, the process of carrying out the heating and evaporation treatment will be schematically described below.

The waste liquor feeding tank 24 stored about 20 lit. of overflow liquid from the automatic processing machine therein. The stored liquid tank 19 is provided with the activated charcoal cartridges 21 packed with the activated charcoal, the stored liquid lead-in pipe 12 and the air lead-in pipe 22. Subsequently, the bag 7 made of polypropylene is set in the sludge receptacle 6 provided below the precipitate separating means 72, and fixed to the lower section 1b of the evaporation vessel 1 by means of two o-rings 8. Next, after feeding of water into the condensing means 11, the apparatus is switched on, and the air pump 23 is actuated and also the air in the stored liquid tank 19 is led into the evaporation vessel 1 through the air lead-in pipe 22.

Next, the air-cooling fan 18 and cooling water circulating pump 16 are actuated in this order, whereby the stored water is circulated in such a way that it is fed from the shower pipe 17 onto the heat dissipation plates 13 of the vapor discharging pipe 9 kept in the condensing means 11 through the cooling water lead-in pipe 15, and again stored at the lower part of the condensing means 11.

Subsequently, the bellows pump 26 is actuated, and the waste liquor in the waste liquor feeding tank 24 passes the heat exchange means 10 through the waste liquor lead-in pipe 25, thereafter being fed into the evaporation vessel 1. The quantity of the waste liquor in the evaporation vessel 1 increases and, once the liquid level is detected by the liquid level sensor 4 for more than, for example, 3 seconds, the bellows pump 26 stops working and at the same time the heating means 2 is switched on, so that the concentration by evaporation is started.

Concentration by evaporation of the photographic process waste liquor is effected by heating and evaporating treatment. The thus produced concentrated liquid is taken out from the lower section 1b of the evaporation vessel 1 by the actuation of the pump 71, fed to the precipitate separating means 72 and the precipitate is separated as the further denser precipitate and discharged. The remaining water content is recovered to the upper section 1a of the evaporation vessel 1. Since such circulation is effected during the processing, the precipietate is not stored in the vicinity of the heating means 2. Accordingly, thermal decomposition of the precipitate can be prevented, odor gas can also be decreased to a great extent and the generation of hydrogen sulfate and sulfur series odor can be alleviated even if the concentration proceeds.

This treatment decreases the liquid quantity of the waste liquor in the evaporation vessel 1 to lower the liquid level. Once the liquid level turns not to be detected by the liquid level sensor 4 for more than 3 seconds, the bellows pump 26 is again switched on, and the waste liquor in the waste liquor feeding tank 24 is fed into the evaporation vessel 1. This operation is repeated.

The vapor evaporated from the evaporation vessel 1 passes the vapor discharging pipe 9, and, after heat exchange with the waste liquor in the heat exchanger 10, it is partially condensed by passing through the condensing means 11 to give a condensed liquid. The condensate liquid is passed through the stored liquid lead-in pipe 12 with the gas remaining in the vapor, and led into the stored liquid tank 19. The condensate liquid is then released from the terminal end 12a below the stored liquid surface, and thereafter the condensate water is stored in the stored liquid tank 19. At this time, bubbling is effected by the air, which is released below the stored liquid surface and rises in the stored liquid. An air such as hydrogen sulfide existing in the stored liquid is removed outside the liquid by the bubbling. The air is recovered from the stored liquid tank 19 to the photographic process waste liquor positioned at the lower section of the evaporation vessel 1 through the air lead-in pipe 22 by use of the actuation of the air pump 23.

Once the liquid level sensor 27 detects that the waste liquor in the waste liquor feeding tank 24 ran short, the bellows pump 26 stops working, the heating means 2 is switched off, the cooling water circulating pump 16 and the fan for air-cooling 18 are stopped after 2 hours, a lamp is turned on and a buzzer also sounds to notify that the concentration-by-evaporation treatment has been completed, and at the same time the air pump 23 stops. At this time, the valve 3 is opened to allow a sludge in the evaporation vessel 1 to drop in the bag 7 made of polypropylene, and thereafter the bag is taken out by releasing the o-rings 8.

Also, when the liquid level sensor 14 detects that the stored water in the condensing means 11 ran short in the course of the concentration by evaporation, a lamp is turned on and a buzzer also sounds to notify that the stored water ran short.

Similarly, in the course of the concentration by evaporation, when the temperature sensor 30 detects that the temperature in the evaporation vessel 1 raised to 120° C. because of an extraordinary lowering of the liquid level for any reason, causing the liquid-empty heating, a lamp is turned on and an alarming buzzer sounds, and at the same time the heating means 2 is switched off. Then, the concentration-by-evaporation treatment is discontinued by a series of the motions as described above.

Figure 3:
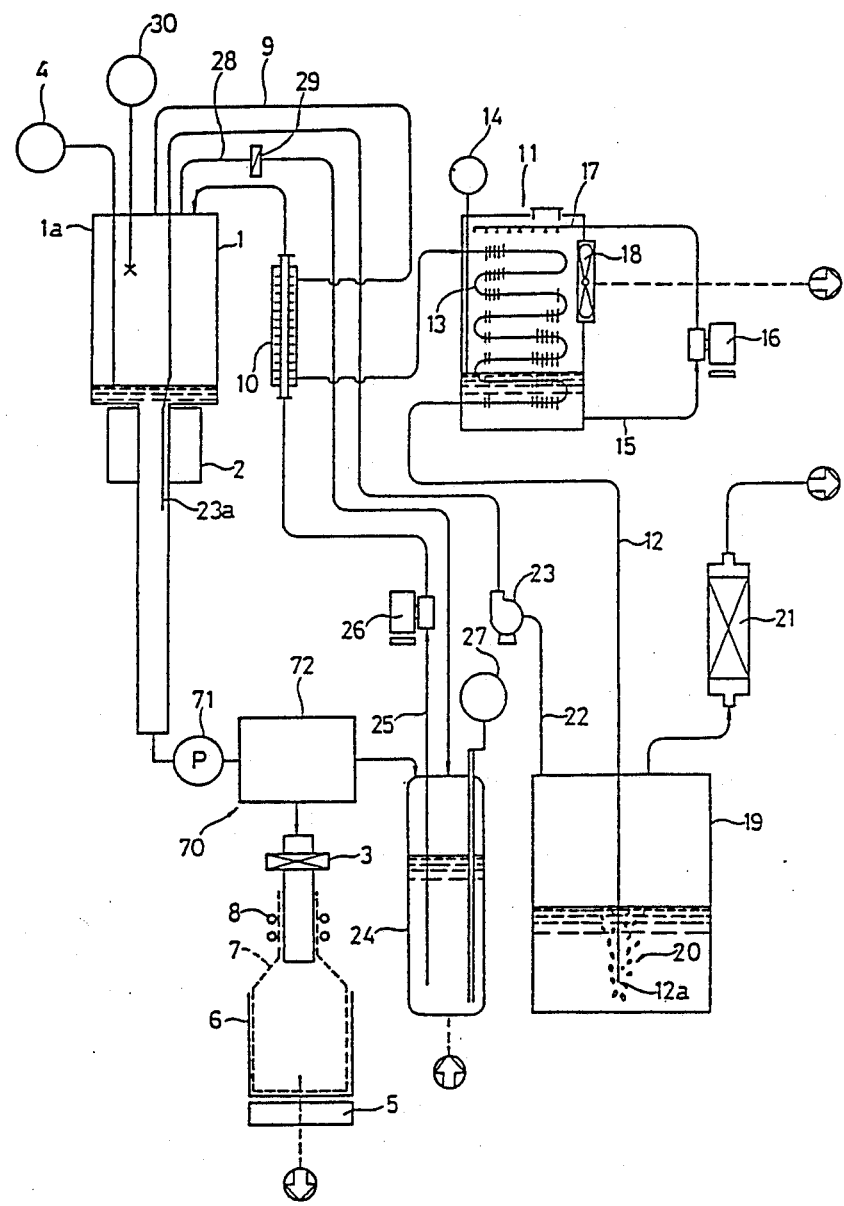

In FIG. 3, a circulating system 70 is provided with the waste liquor-feeding tank 24, the remaining water content separated in the precipitate separating means 72 is fed to the waste liquor-feeding tank 24 and mixed with the photographic process waste liquor to be fed to the evaporation vessel 1. Further, in this embodiment, the heating means 2 is provided on the periphery outside of the lower section 1b of the evaporation vessel 1 so that the precipitate does not remain at the lower section 1b of the evaporation vessel 1 where the heating means 2 is provided.

Figure 4:
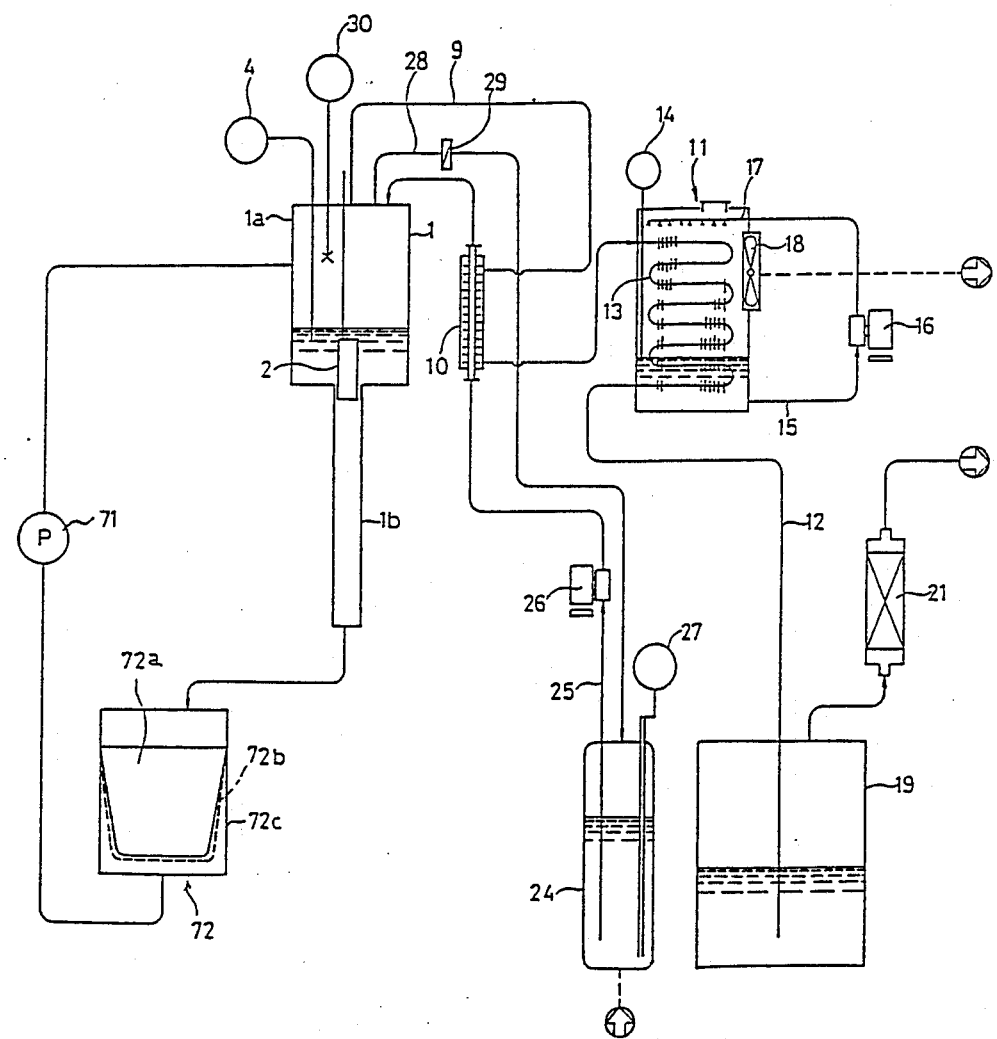

In FIG. 4, the precipitate separating means 72 in the circulation system 70 is composed of a filter bag 72a. The filter bag 72a is mounted to a receptacle 72c through, for example, a net 72b with the opening of 2 mm. When the precipitate is stored in the filter bag 72a, the filter bag 72a is changed. The separated liquid stored in the receptacle 72c is recovered to the evaporation vessel 1 by the actuation of the pump 71 arranged at the posterior step.

Figure 5:
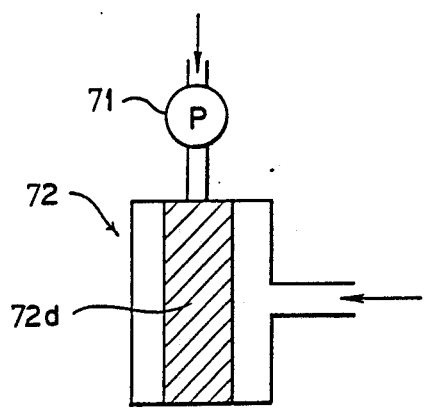
Figure 6:
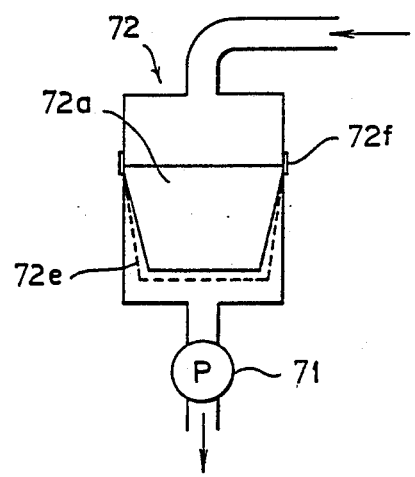
Figure 7:
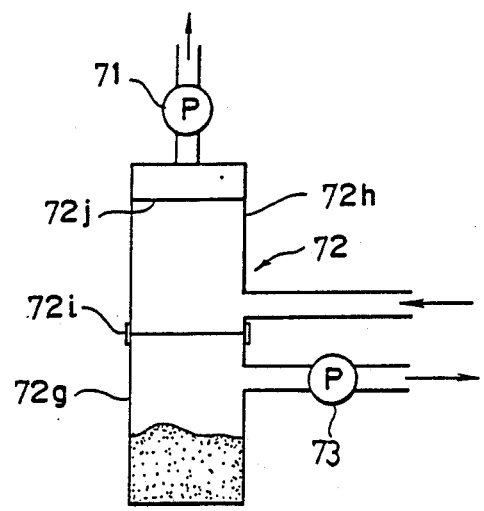

FIGS. 5 to 7 denote further embodiments of the precipitate separating means 72. In FIG. 5, a cylindrical filter 72d is employed. In FIG. 6, a filter bag 72a is provided to a net-like pedestal 72e having a large opening. The filter bag 72a is removable by means of fitment 72f. In FIG. 7, a lower container 72g and an upper container 72h are connected at a connecting section 72i, the upper container 72h is provided with a filter 72j such that the precipitate is taken out to the lower container 72g. When the precipitate is taken out, the pump 73 is actuated to remove the remaining liquid in the lower container 72g.

FIGS. 8 to 12 denote further embodiments of the precipitate separating means 72. In each drawing, the precipitate separating means 72 is composed of a centrifugal filtrating means.

Figure 8:
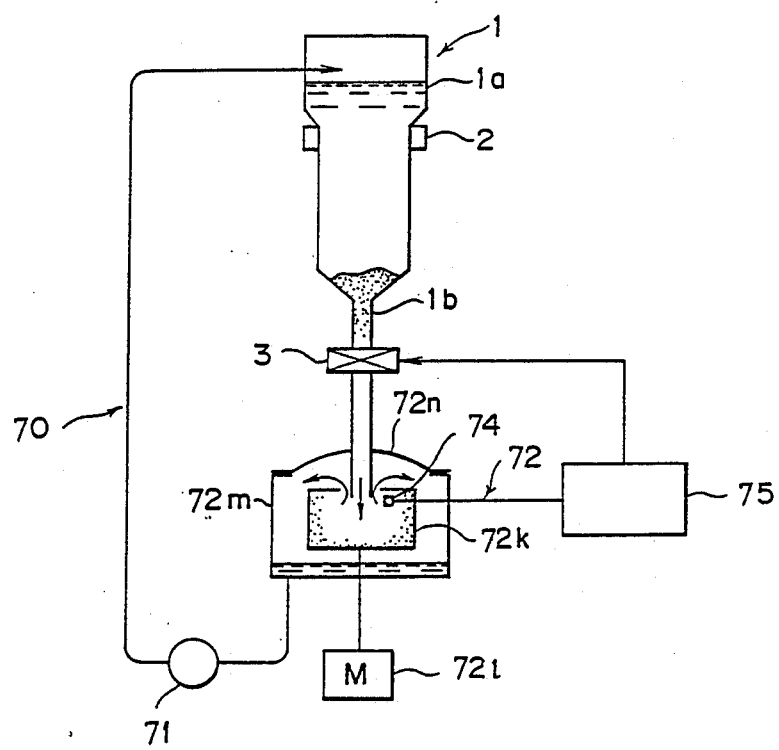

In FIG. 8, a centrifugal filtrating means is provided as the precipitate separating means 72 at the lower section 1b of the evaporation vessel 1 through the valve 3. The precipitate is fed into the centrifugal housing 72k. The centrifugal housing 72k is rotated by means of a motor 72l, then the precipitate and water are separated by centrifugal force, subsequently the water is flowed outside the centrifugal housing 72k to gather in the container 72m, the gathered water is recovered to the evaporation vessel 1 by the actuation of the pump 71.

In the centrifugal separating treatment, a liquid detecting means 74 detects the concentration-by-evaporation liquid in the centrifugal housing 72k. When the liquid detecting means 72k detects that the liquid ran short, predetermined amount of the concentration-by-evaporation liquid is fed by opening the valve 3 by use of a cotrolling device 75, and the centrifugal separation treatment is repeated.

Figure 9:
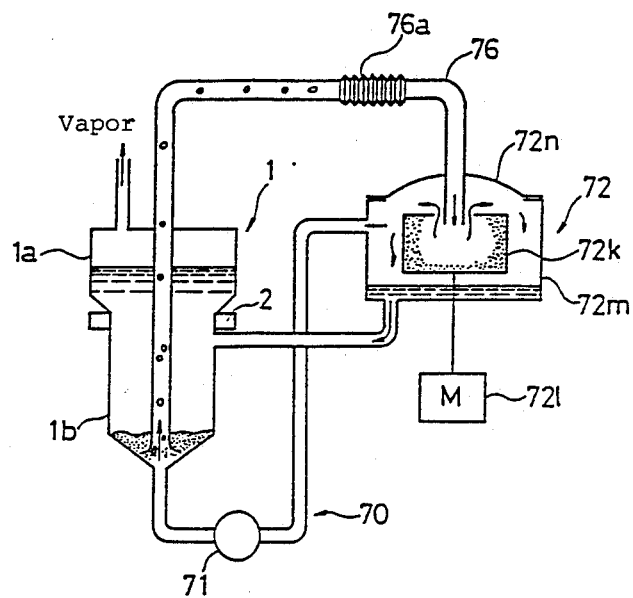

In FIG. 9, a centrifugal filtrating means which is the precipitate separating means 72 is provided at the portion upper than the evaporation vessel 1, and the air in the container 72m is fed to the bottom section of the evaporation vessel 1 by use of the pump 71. The concentration-by-evaporation liquid in the evaporation vessel 1 is fed to the centrifugal housig 72k through a pipe 76 which passes through a lid 72n of the container 72m. Accordingly, for facilitating the opening and closing of the lid 72n when the precipitate is taken out from the centrifugal housing 72k, a bellows section 76a is provided. Also, the separated water to be stored in the container 72m is recovered to the evaporation vessel 1.

Figure 10:
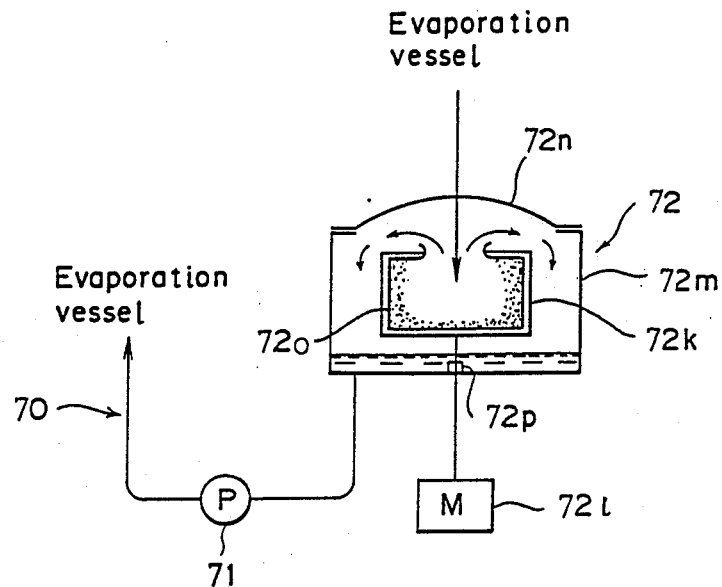
Figure 11:
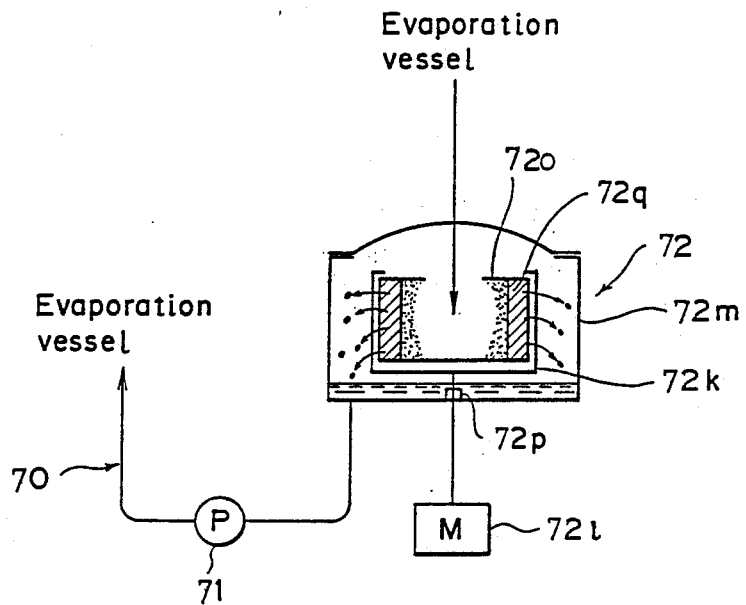
Figure 12:
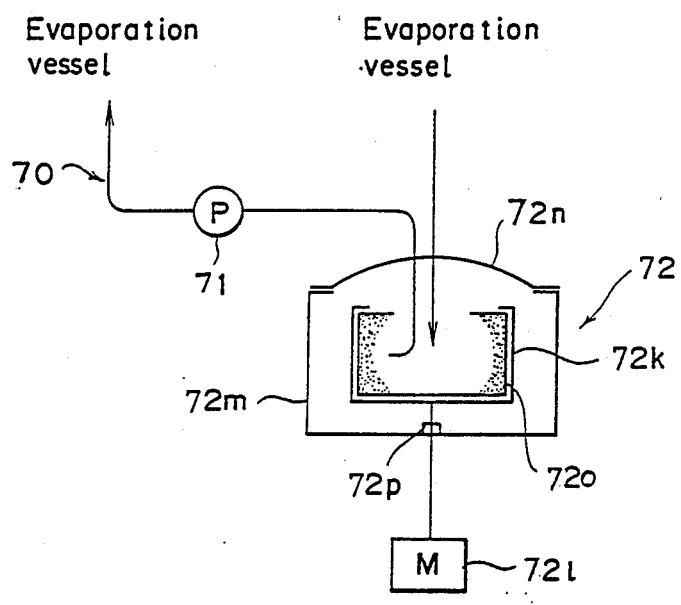

FIGS. 10 to 12 denote further specific examples of the centrifugal filtrating means of FIGS. 8 and 9.

In FIG. 10, a precipitate taking-out case 72o is fixed in the centrifugal housing 72k by means of engagement, thread-mount, etc. so that it is rotatable with the centrifugal housing 72k. To the centrifugal housing 72k, an output shaft of a motor 72l passing through the container 72m is fixed, and it is rotated by means of the motor 72l. The portion on which the output shaft of the motor 72l passed through is sealed by means of a sealing material 72p.

The material of the container 72m and the centrifugal housing 72k may be any material of heat resistant property, for example, heat resistant glass, titanium, stainless steel, carbon steel, heat resistant plastics, etc., but preferably be of stainless steel (preferably SUS 304 and SUS 316, particularly preferably SUS 316) and titanium from the viewpoint of safety and anticorrosion property.

Also, the rotating ratio of the motor 72l is in the range of, for example, 1 to 100,000 rpm, but should be set depending on the treating amount, treating ratio, etc., preferably 10 to 10,000 rpm, particularly preferably 50 to 3,000 rpm.

The concentration-by-evaporation liquid is fed from the lower section 1b of the evaporation vessel 1 into the precipitate taking-out case 72o in the centrifugal housing 72k. Here, the precipitate is collected at the peripheral portion in the precipitate taking-out case 72o, i.e. on the internal wall surface of the precipitate taking-out case 72o and the water to the central portion thereof by the centrifugal force due to rotation with the centrifugal housing 72k. The separated water is overflowed from the upper opening portion of the centrifugal housing 72k into the container 72m. The water in the container 72m is recovered to the evaporation vessel 1 by the pump 71. This treatment is repeated and the precipitate having been removed its water content remains in the precipitate taking-out case 72o.

When the predetermined amount of the precipitate is stored in the precipitate taking-out case 72o, the torque of the motor 72l which rotates the centrifugal housing 72k increases, the torque is detected by means of the torque detecting means (not shown in the drawing), the valve is closed by means of the controlling device 75 shown in FIG. 8 to stop the treatment. In the case of the apparatus shown in FIG. 9, the pump 71 is stopped. Consequently, the precipitate taking-out case 72o in the centrifugal housig 72k is taken out to dispose the precipitate. The precipitate taking-out case 72o is made of, for example, deformable material and is removable from the centrifugal housing 72k. The precipitate taking-out case 72o may be a bag made of resin.

Also, the precipitate in the precipitate taking-out case 72o may be detected by means of an optical sensor. In the case of the device shown in FIG. 11, the sensor detects liquid overflowed from the upper portion of the precipitate taking-out case 72o to detect that a filter 72q is filled with the precipitate. In such cases, similarly as in the above, the valve 3 is closed by means of the controlling device 75.

FIG. 11 shows a precipitate taking-out case 72o having a filter 72q inside a centrifugal housing 72k. By the rotation of the precipitate taking-out case 72o, the water content is filtered off by centrifugal force to be discharged into the container 72m. In this case, similarly as in the above, the operation is stopped by detecting that the predetermined amount of the precipitate is stored in the precipitate taking-out case 72o. The detection of storage of the predetermined amount of the precipitate may be carried out by detecting that water is overflowed from the center portion of the precipitate taking-out case 72o.

In FIG. 12, the precipitate taking-out case 72o as shown in FIG. 10 is provided inside the centrifugal housing 72k such that the water is taken out to the precipitate taking-out case 72o. The water filtered by the centrifugal force is recovered to the evaporation vessel 1.

In FIGS. 10 to 12, the precipitate in the evaporation vessel 1 is fed from the lid 72n of the container 72m. The feeding pipe may preferably be made of flexible resin for making it possible to open the lid 72n to take out the precipitate taking-out case 72o without releasing the feeding pipe. Also, instead of connecting the feeding pipe to the lid 72n, the feeding pipe may be made to pass through the container 72m to feed the precipitate into the precipitate taking-out case 72o.

Figure 13:
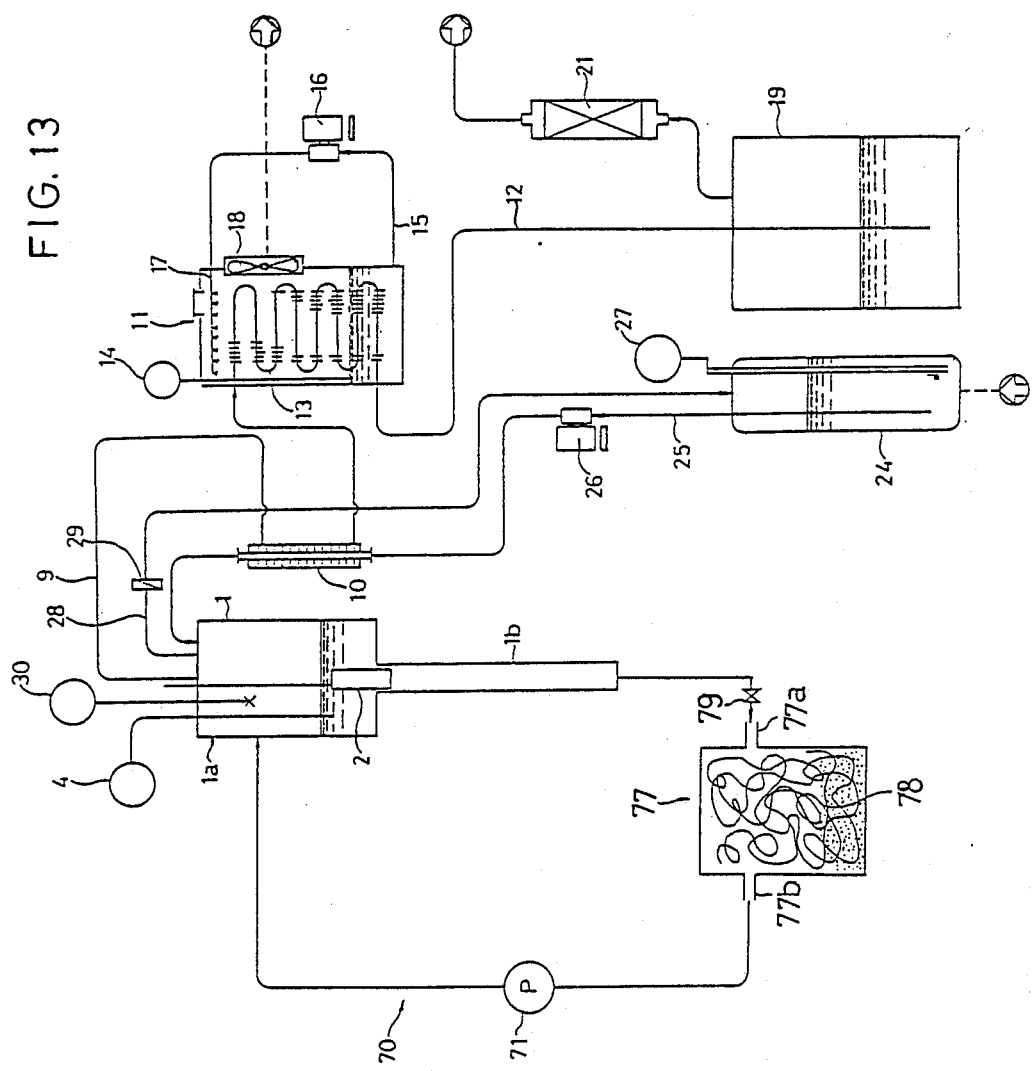

FIG. 13 is a schematic constitutional drawing of the apparatus of this invention, for treating the photographic process waste liquor.

In FIG. 13, the numeral 1 denotes an evaporation vessel as an evaporating means, composed of a cylindrical upper section 1a having a larger diameter and a cylindrical lower section 1b having a smaller diameter, and provided at the upper section 1a is a heating means 2. A liquid level sensor 4 is provided at the upper section 1a of the evaporation vessel 1, and further a circulation system 70 is provided between the lower section 1b and the upper section 1a of the evaporation vessel 1. In the circulation system 70, there are provided a pump 71 and a precipitating tank 77. A concentrated liquid is taken out from the lower section 1b of the evaporation vessel 1 by the actuation of the pump 71 to be fed to the precipitating tank 77. In the precipitating tank 77, an obstacle 78 made of a thread-like material is installed and the concentrated liquid collides with the obstacle 78 to allow particles to settle. Then, they are deposited as the precipitate, whereas particles remaining suspended are recovered with a passing liquid to the upper section 1a of the evaporation vessel 1. The feeding section 77a to feed the concentrated liquid to the precipitating tank 77 is formed horizontally, and a taking-out section 77b for taking out the precipitate is also formed horizontally, thereby feeding and discharging are effected in the horizontal direction for making it possible to collide the concentrated liquid with the obstacle 78. Further, the feeding section 77a and the taking-out section 77b are provided laterally to the upper portions of the precipitating tank 77, thereby the precipitate deposited may not disturb the passing of the concetrated liquid. Other parts provided in this processing apparatus are basically the same as those used in the apparatus of FIG. 2. Accordingly, the description of such parts is omitted.

Next, the schematical process of evaporation-by-heating treatment by means of FIG. 13 will be described. It is mostly the same as in FIG. 2 other than the following process.

The photographic process waste liquor is concentrated by evaporation by evaporation-by-heating treatment. The concentrated liquid produced by the treatment is taken out from the lower section 1b of the evaporation vessel 1 by the actuation of the pump 71 and conveyed to the precipitating tank 77, where the precipitate collides with the obstacle 78 and is deposited. The remaining water content is recovered to the upper section 1a of the evaporation vessel 1. In this treatment, since such a circulation is effected and the precipitate is taken out, the precipitate does not stay in the vicinity of the heating means 2. Accordingly, thermal decomposition of the precipitate can be prevented, odor gas can also be decreased to a great extent, and the generation of hydrogen sulfide and surfur series odor can be alleviated even if the concentration proceeds. The precipitate deposited in the precipitating tank 77 is discharged with the obstacle 78, and the obstacle is changed with the new obstacle 78.

The position of the precipitating tank 77 is not limitative and it may arbitrarily be provided at any position. However, when the tank is provided to the section lower than the evaporation vessel 1, the obstacle 78 is changed while the valve 79 being closed. On the other hand, the precipitating tank 77 may be provided to the section upper than the surface level of the photographic process waste liquor in the evaporation vessel 1. In this case, since the closed structure of the precipiating tank 77 may be simple, and pressure becomes low, opening and closing of the lid may be facilitated, when the obstacle is changed, favorably.

Figure 14:
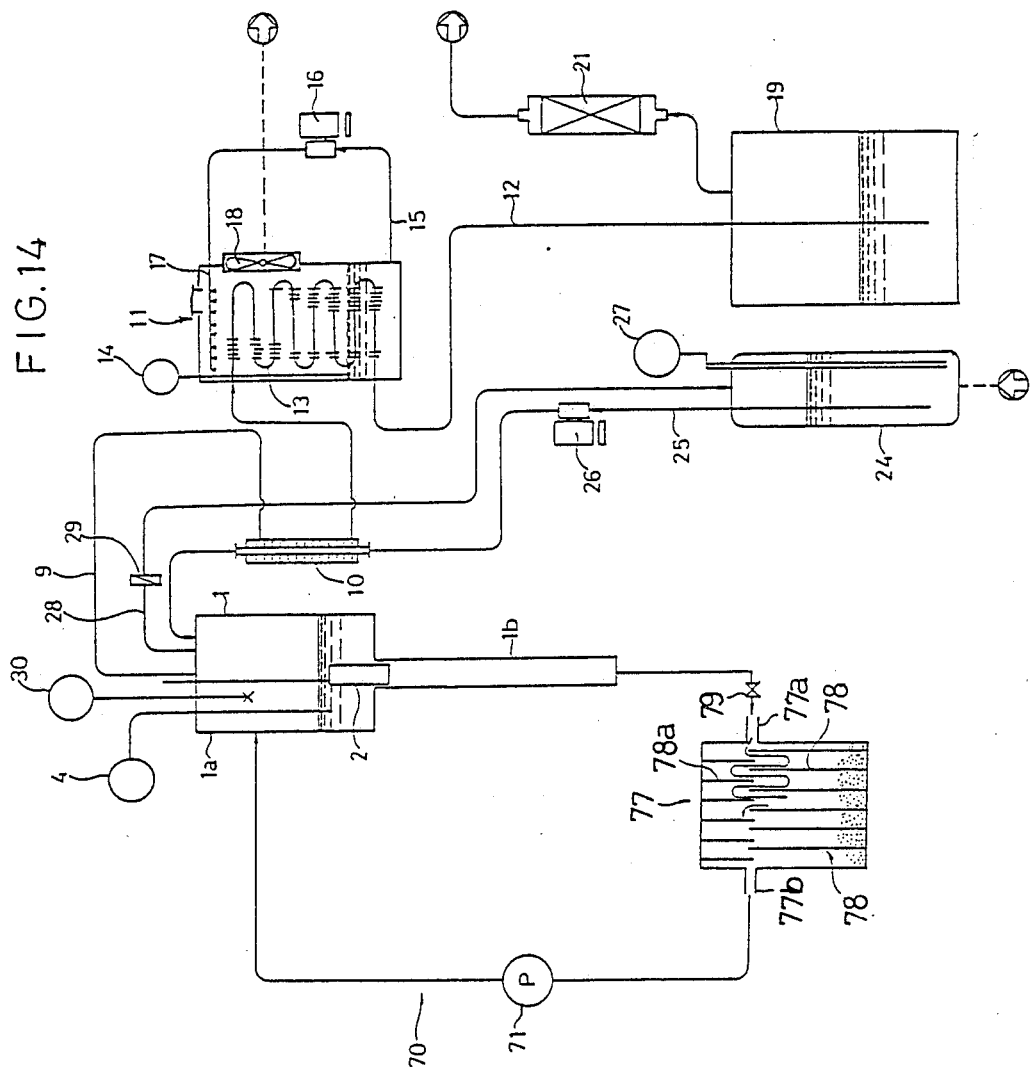

In the embodiment shown in FIG. 14, the obstacle 78 in the precipitating tank 77 is constituted such that plural plates 78a are provided from the upper and lower sides alternatively, and the concentrated liquid to be supplied may pass through the baffled path formed by the plates 78a. Thus, when the concentrated liquid passes the passage formed by the obstacle 78, the liquid collides with the plates 78a to allow the particles to settle. Accordingly, particles which are interrupted to pass the obstacle are deposited.

In FIGS. 15 to 18, another embodiments of the precipitating tank 72 are shown. In the precipitating tank 77 of FIG. 15, the obstacle 78 is housed in the container 80 which is covered with the lid 81 and is tightly closed with the snap 82. The cock 83 is provided to the feeding and discharging side, respectively, which is automatically operated manually or by means of an electromagnetic valve. Accordingly, the precipitate deposited in the container 80 can be discharged by opening and closing the lid 80.

Figure 16:
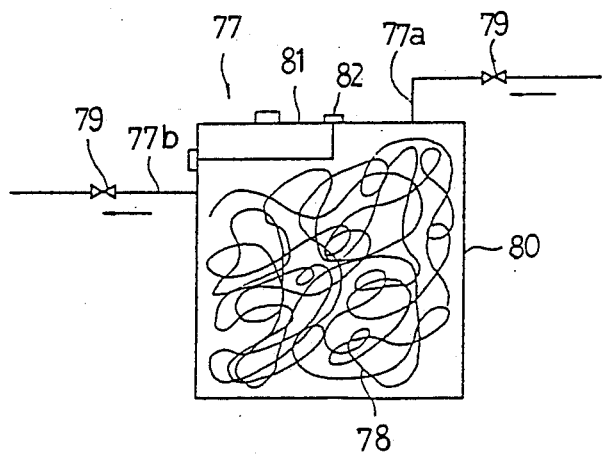

In FIG. 16, the lid 81 is provided on a part of the upper section of the container 80 of the precipitating tank 77 and the feeding section 77a is provided further to the upper section to feed the concentrated liquid from the upper section.

Figure 17:
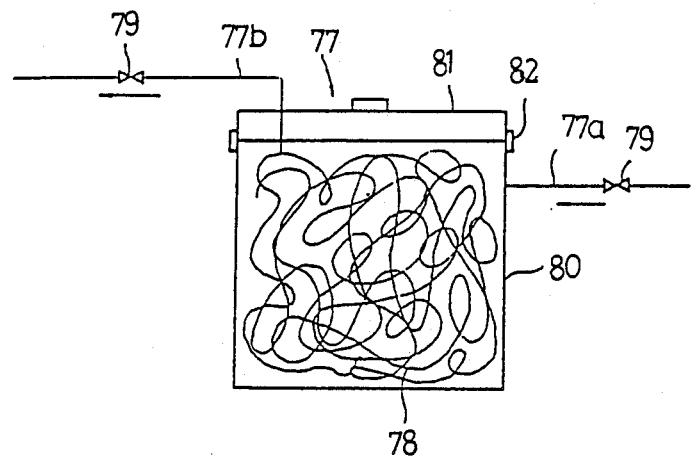

In FIG. 17, the feeding section 77a is provided to the side of the container 80 of the precipitating tank 77. In this embodiment, the taking-out section 77b is provided through the upper lid 81 so that the passing liquid may be taken out at the upper section.

Figure 18:
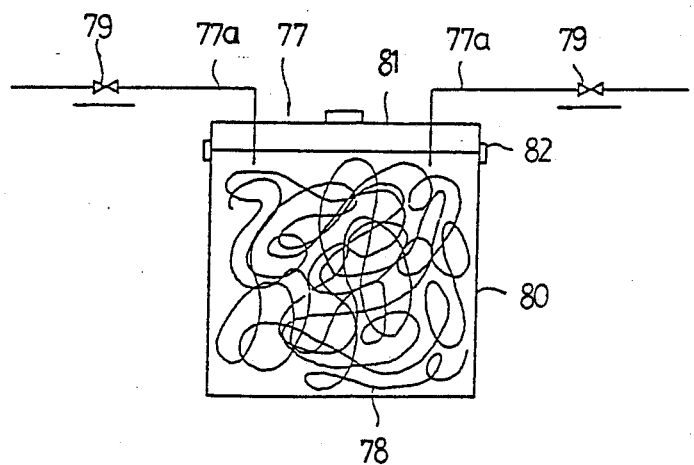

In FIG. 18, the feeding section 77a and the taking-out section 77b are provided through the lid 81 of the container 80 in the precipitating tank 77 such that the concentrated liquid is fed from the upper section and a passing liquid is taken out from the upper section.

Figure 19:
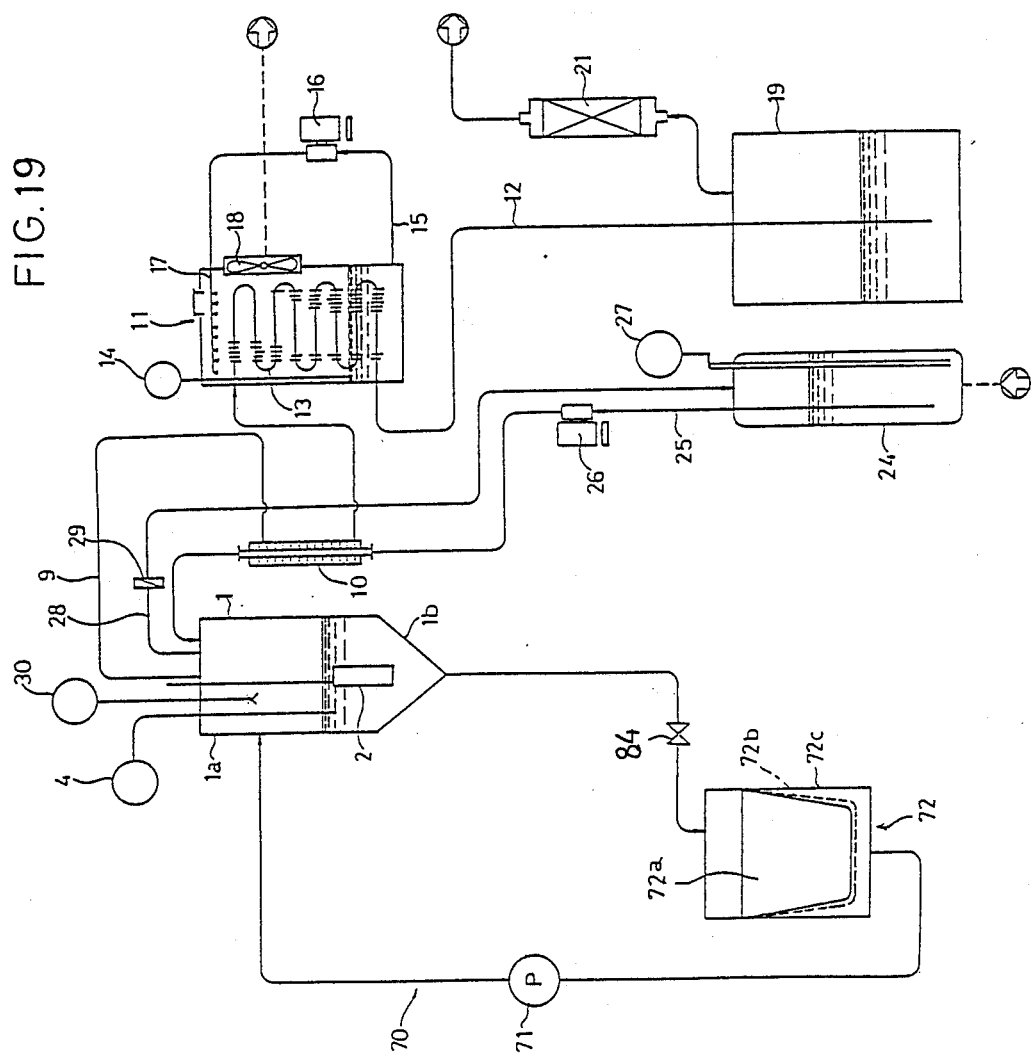

FIG. 19 is a schematic constitutional illustration showing the apparatus of this invention, for treating the photographic process waste liquor.

In the drawing, the numeral 1 denotes an evaporation vessel as an evaporating means, wherein a heating means 2 is provided to the upper section 1a and the taking-out section 1b is provided to the bottom section. The circulation system 70 is provided between the upper section 1a of the evaporation vessel 1 and the taking-out section 1b. The sectional area of the taking-out section 1a is formed as a taper such that the sectional area may become smaller successively to the taking-out direction, wherein the concentrated liquid is cooled to accelerate separation of the precipitate, as well as the precipitate together with the concentrated liquid is guided in the taking-out section 1b for making it possible to discharge the concentrated liquid smoothly and securely to the circulation system 70.

The pump 71 and the precipitate separating means 72 are provided in the circulation system 70 wherein the concentrated liquid is taken out with the precipitate from the taking-out section 1b of the evaporation vessel 1 by the actuation of the pump 71 and the concentrated liquid is fed to the precipitate separating means 72.

The precipitate separating means 72 is composed of a filter bag 72a. The filter bag 72a is mounted to a receptacle 72c through, for example, a net 72b with the opening of 2 mm. The separated liquid stored in the receptacle 72c is recovered to the evaporation vessel 1 by the actuation of the pump 71 arranged at the posterior step. When the precipitate is stored in the filter bag 72c, a valve 84 is closed to stop feeding-in of the concentrated liquid and the filter bag 72a is changed in such situation.

Since the process of evaporation by heating treatment by means of this apparatus is basically the same as in FIG. 2, the description is omitted.

Figure 20:
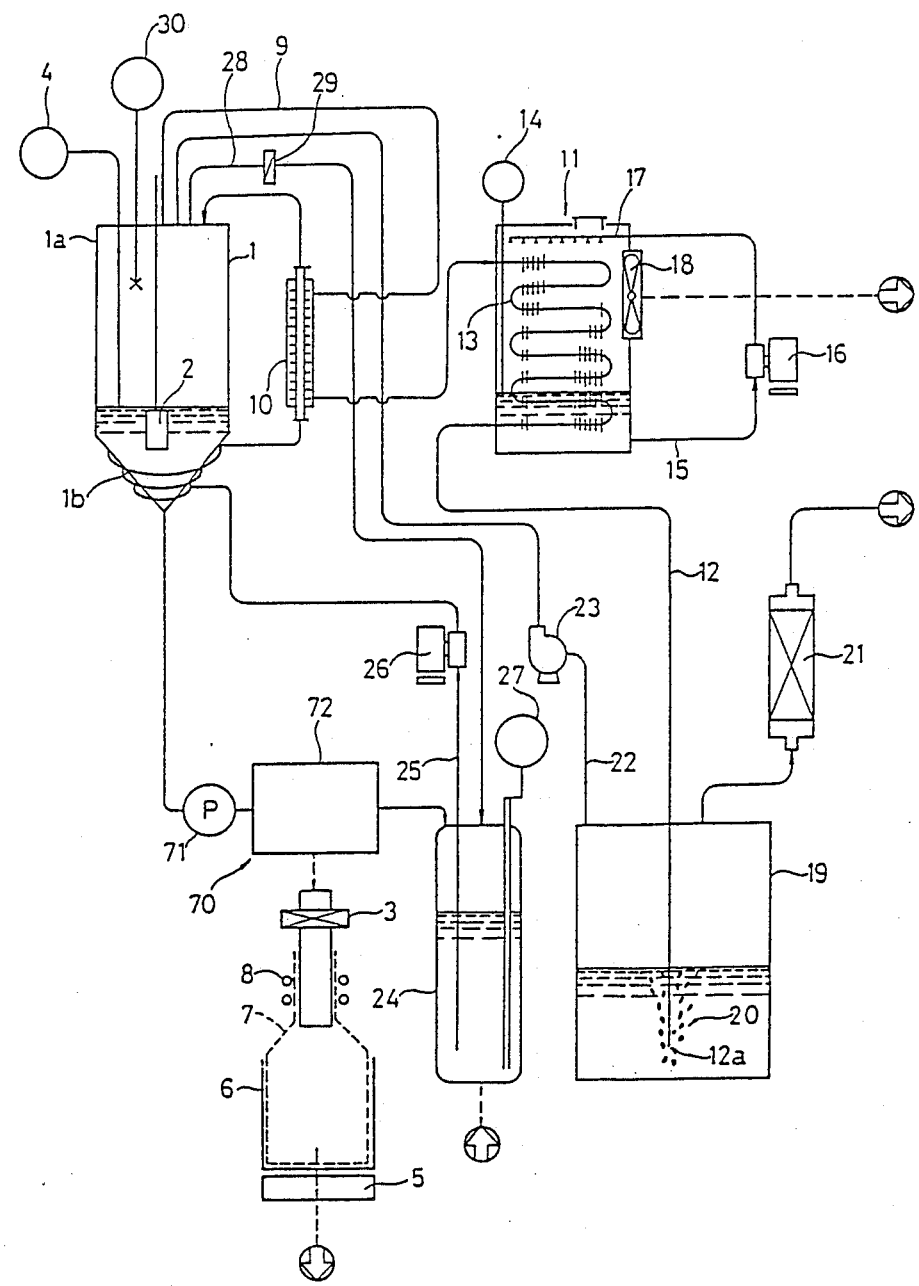

In FIG. 20, the waste liquor feeding tank 4 is provided to the circulation system 70. The remaining liquid having been separated in the precipitate separating means 72 is fed to the waste liquor feeding tank 24, and the liquid is mixed with the waste liquor in this apparatus and the mixture is then fed to the evaporation vessel 1.

Moreover, in this example, the waste liquor lead-in pipe 25 is connected to the taking-out section 1b of the evaporatin vessel 1 and further to the upper section 1a through the heat exchanger 10. Accordingly, the taking-out section 1b of the evaporation vessel 1 is cooled through the heat exchange with the photographic process waste liquor to be fed to the evaporation vessel 1 by the actuation of the bellows pump 26. On the other hand, the photographic process waste liquor is preheated at the taking-out section 1b, further preheated by the heat exchanger 10 and is then fed to the evaporation vessel 1.

At the lower part of the precipitate separating means 72, a sludge receptacle 6 is mounted on a pedestal 5. Inside the sludge receptacle 6, a bag 7 made of polypropylene is fixed by means of o-rings 8, and the precipitate separated is discharged by the opening and closing of the ball valve 3.

Figure 21:
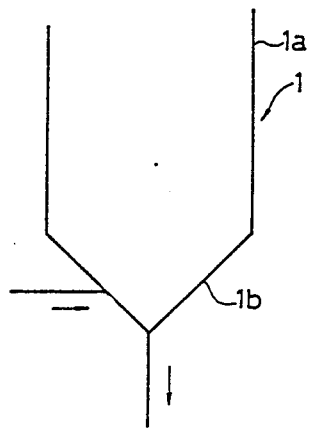
Figure 22:
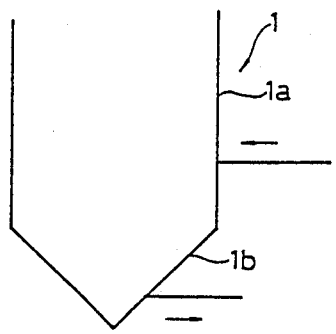
Figure 23:
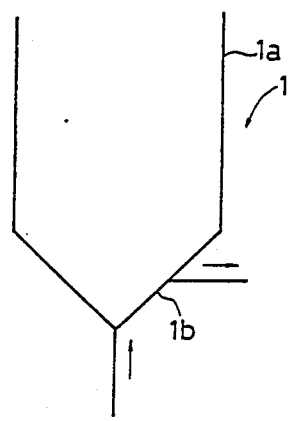

In FIGS. 21 to 26, another embodiments are shown. In FIGS. 21 to 23, the taking-out section 1b of the evaporation vessel 1 is formed similarly in a taper shape. The apparatus shown in FIG. 21 is constituted such that the concentrated liquid may be taken out from the lowest part of the taking-out section 1b of the evaporation vessel 1 and the concentrated liquid is recovered to the intermediate part to accelerate the circulation of the concentrated liquid in the taking-out section 1b. The apparatus shown in FIG. 22 is constituted such that the concentrated liquid is taken from the intermediate portion of the taking-out section of the evaporation vessel 1, and the liquid is recovered to the upper section 1a to effect circulation of the whole concentrated liquid. In FIG. 23, the concentrated liquid is taken out from the intermediate portion of the taking-out section 1b of the evaporation vessel 1, and is recovered from the lowest portion of the taking-out section so that no clogging may occur when precipitate is taken out.

Figure 24:
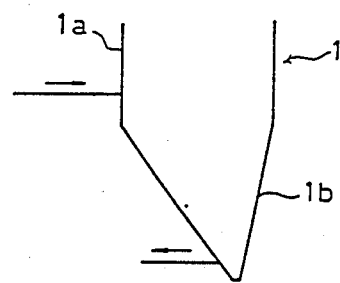
Figure 25:
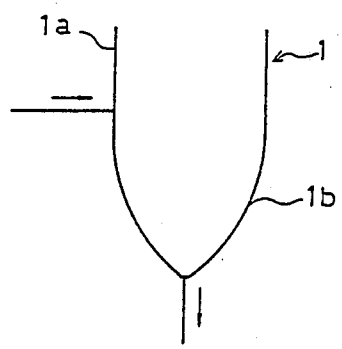
Figure 26:
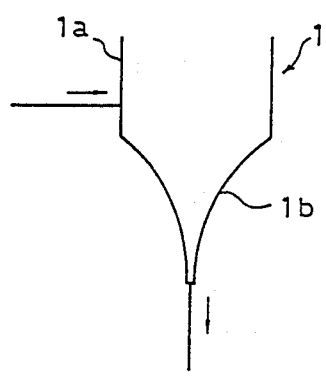

In FIGS. 24 to 26, modification was made for the taking-out section 1b of the evaporation vessel 1. In FIG. 24, the angle of slope of the taper of the taking-out section 1b of the evaporation vessel 1 is changed; in FIG. 25, the taking-out section 1b of the evaporation vessel 1 is curved to outside; and in FIG. 26, the taking-out section 1b of the evaporation vessel 1 is curved inside to the contrary of the shape of the taking-out section 1b shown in FIG. 25.

[EXAMPLES]

After imagewise printing on a commercially available color photographic paper (produced by Konica Corporation) by means of an automatic processing machine RP-800 (produced by Konica Corporation) for NPS processing system paper, continuous processing was carried out with use of the following processing steps and processing solutions.

| Standard processing steps: | | |
|---|---|---|
| (1) Color developing | 40° C. | 3 min. |
| (2) Bleach-fixing | 38° C. | 1 min. 30 sec. |
| (3) Stabilizing | 25° C. to 35° C. | 3 min. |
| (4) Drying | 75° C. to 100° C. | about 2 min. |

| [Color developing tank solution] | |
|---|---|
| Ethylene glycol | 15 ml |
| Potassium sulfite | 2.0 g |
| Potassium bromide | 1.3 g |
| Sodium chloride | 0.2 g |
| Potassium carbonate | 24.0 g |
| 3-Methyl-4-amino-N-ethyl-N-($\beta$-methanesulfonamidoethyl)aniline sulfate | 5.5 g |
| Brightening agent (a 4,4'-diaminostilbenedisulfonic acid derivative) | 1.0 g |
| Hydroxylamine sulfate | 3.0 g |
| 1-Hydroxyethylidene-1,1-diphosphonic acid | 0.4 g |
| Hydroxyethyliminodiacetic acid | 5.0 g |
| Magnesium chloride.hexahydrate | 0.7 g |
| Disodium 1,2-dihydroxybenzene-3,5-disulfonate | 0.2 g |

Made up to 1 liter by adding water, and adjusted to pH 10.20 using potassium hydroxide and sulfuric acid.

| [Color developing replenishing solution] | |
|---|---|
| Ethylene glycol | 20 ml |
| Potassium sulfite | 3.0 g |
| Potassium carbonate | 24.0 g |
| Hydroxylamine sulfate | 4.0 g |
| 3-Methyl-4-amino-N-ethyl-N-($\beta$-methanesulfonamidoethyl)aniline sulfate | 7.5 g |
| Brightening agent (a 4,4'-diaminostilbenedisulfonic acid derivative) | 2.5 g |
| 1-Hydroxyethylidene-1,1-diphosphonic acid | 0.5 g |
| Hydroxyethyliminodiacetic acid | 5.0 g |
| Magnesium chloride.hexahydrate | 0.8 g |
| Disodium 1,2-dihydroxybenzene-3,5-disulfonate | 0.3 g |

Made up to 1 liter by adding water, and adjusted to pH 10.70 using potassium hydroxide and sulfuric acid.

| [Bleach-fixing tank solution] | |
|---|---|
| Ethylenediaminetetraacetic acid ferric ammonium dihydrate | 60.0 g |
| Ethylenediaminetetraacetic acid | 3.0 g |

[Bleach-fixing tank solution]

| | |
|---|---|
| Ammonium thiosulfate (a 70% solution) | 100 ml |
| Ammonium sulfite (a 40% solution) | 27.5 ml |

Made up to 1 liter as a whole by adding water, and adjusted to pH 7.1 using potassium carbonate or glacial acetic acid.

[Bleach-fixing replenishing solution A]

| | |
|---|---|
| Ethylenediaminetetraacetic acid ferric ammonium dihydrate | 260.0 g |
| Potassium carbonate | 42.0 g |

Made up to 1 liter as a whole by adding water. The pH of this solution is adjusted to 6.7±0.1 with use of acetic acid or ammonia water.

[Bleach-fixing replenishing solution B]

| | |
|---|---|
| Ammonium thiosulfate (a 70% solution) | 250.0 ml |
| Ammonium sulfite (a 40% solution) | 25.0 ml |
| Ethylenediaminetetraacetic acid | 17.0 g |
| Glacial acetic acid | 85.0 ml |

Made up to 1 liter as a whole by adding water. The pH of this solution is adjusted to 5.3±0.1 with use of acetic acid or ammonia water.

[Washing-substitutive stabilizing tank solution and replenishing solution]

| | |
|---|---|
| Ethylene glycol | 1.0 g |
| 2-Methyl-4-isothiazolin-3-on | 0.20 g |
| 1-Hydroxyethylidene-1,1-diphosphonic acid (a 60% solution) | 1.0 g |
| Ammonia water (a 25% aqueous solution of ammonium hydroxide) | 2.0 g |

Made up to 1 liter by adding water, and adjusted to pH 7.0 using 50% sulfuric acid.

An automatic processing machine was filled in the tanks with the above color developing tank solution, bleach-fixing tank solution and stabilizing tank solution to carry out a running set while processing a sample of the above commercially available color photographic paper and while replenishing the above color developing replenishing solution, bleach-fixing replenishing solutions A and B and stabilizing replenishing solution through a bellows pump. The amount for replenishing was such that the color developing tank was replenished in an amount of 190 ml, the bleach-fixing tank was replenished in an amount of 50 ml for each of the bleach-fixing replenishing solutions A and B, and the stabilizing tank was replenished with the washing-substitutive stabilizing replenishing solution in an amount of 250 ml, each per 1 $m^2$ of the color paper. The stabilizing tank in the automatic processing machine was comprised of stabilizing tanks comprising a first to third tanks in the direction of the flow of the sample, wherein the replenishing was carried out from the last tank, the solution overflowed from the last tank was flowed into the tank anterior thereto and further the solution overflowed therefrom was flowed into the tank further anterior thereto, taking the multi-tank counter-current system.

The continuous processing was carried out until the total replenishing amount of the washing-substitutive stabilizing solution reaches 3 times of the capacity of the stabilizing tank.

Next, after color negative films GX-100 (Trade name; produced by Konica Corporation) were subjected to exposure according to a conventional method, continuous treatment was carried out under the following processing conditions by use of the automatic processing machine which is a remodel of a negative film processor NPS-FP 34 (produced by Konica Corporation).

| Processing steps | Time (hours, minutes) | Temperature (°C.) | Tank capacity (lit.) | Replenished amount (ml/$dm^2$) |
|---|---|---|---|---|
| Color developing | 3'15" | 38 ± 0.3 | 18 | 15 |
| 1st bleach-fixing tank | 2'00" | 38 ± 0.3 | 15 | — |
| 2nd bleach-fixing tank | 2'00" | 38 ± 0.3 | 15 | 10 |
| 1st washing-substitutive stabilizing tank | 1'00" | 38 ± 0.3 | 9 | — |
| 2nd washing-substitutive stabilizing tank | 1'00" | 38 ± 0.3 | 9 | 10 |
| Stabilizing | 40" | 38 ± 0.3 | 9 | 10 |
| Drying | 1'30" | 38 ± 0.3 | — | — |

From the 2nd no-water washing stabilizing tank to the 1st no-water washing stabilizing tank, the countercurrent system (2-steps counter current) was employed. Similarly, from the 2nd bleach-fixing tank to the 1st bleach-fixing tank, the counter-current system was employed.

In each tank, the amount of replenishing solution carried from the anterior tank was 0.6 ml/$dm^2$.

The recipe of the solutions for tanks and respective replenishing solutions thereof are shown below.

[Color developing tank solution]

| | |
|---|---|
| Potassium carbonate | 30 g |
| Sodium sulfite | 2.0 g |
| Hydroxylamine sulfate | 2.0 g |
| 1-Hydroxyethylidene-1,1-diphosphonic acid (60% aqueous solution) | 1.0 g |
| Hydroxyethyliminodiacetic acid | 3.0 g |
| Magnesium chloride | 0.3 g |
| Potassium bromide | 1.2 g |
| Sodium hydroxide | 3.4 g |
| N-ethylene-N-β-hydroxyethyl-3-methyl-4-amino anilin chlorate | 4.6 g |

Made up to 1 liter by adding water, and adjusted to pH 10.1 using sodium hydroxide.

[Color developing replenishing solution]

| | |
|---|---|
| Potassium carbonate | 40 g |
| Sodium sulfite | 3.0 g |
| Hydroxylamine sulfate | 3.0 g |
| Diethylenetriamine.pentaacetic acid | 3.0 g |
| Potassium bromide | 0.9 g |
| Sodium hydroxide | 3.4 g |
| M-ethylene-N-β-hydroxyethyl-3-methyl-4-aminoanilin chlorate | 5.6 g |

Made up to 1 liter by adding water, and adjusted to pH 10.1 using sodium hydroxide.

[Bleach-fixing tank solution and its replenishing solution]

| | |
|---|---|
| Diethylenetriamine.pentaacetic acid ferric ammonium salt | 0.5 mol |
| Hydroxyethyliminodiacetic acid | 20 g |
| Ammonium thiosulfate (a 70% wt/vol solution) | 250 ml |
| Ammonium sulfite | 15 g |
| 2-Amino-5-mercapto-1,3,4-thiadiazole | 1.0 g |
| Ammonia water (28%) | 20 ml |

Made up to 1 liter as a whole by adding water, and adjusted to pH 7.6 using acetic acid and ammonia water.

[Washing-substitutive stabilizing tank and its replenishing solution]

| | | |
|---|---|---|
| 5-Chloro-2-methyl-4-isothiazoline-3-on | 0.01 | g |
| 2-methyl-4-isothiazoline-3-on | 0.01 | g |
| Ethylene glycol | 2.0 | g |
| Diethylenetriamine.pentaacetic acid ferric ammonium salt | 0.03 | mol |

Made up to 1 liter by adding water. The pH of this solution is adjusted to 10.0 with use of ammonium and sulfuric acid.

[Stabilizing tank solution and its replenishing solution]

| | |
|---|---|
| Formalin (37% aqueous solution) | 3 ml |
| Konidax (produced by Konica Corporation) | 7 ml |

Made up to 1 liter by adding water.

Continuous treatment was conducted until the total replenishing amount of the color deveoping solution becomes 3 times of the volume of the color developing solution tank.

The waste liquor used for the treatment of the color photographic paper and the waste liquor used for the above treatment of the color negative film were mixed in the ratio of 50 to 50.

[EXPERIMENT 1]

The following experiment was carried out by using the above mixed waste liquor by means of the apparatus of FIG. 4, for treating the photographic process waste liquor.

The sizes of opening of the filter bag to be used were changed from 0.2 to 500 μm as shown in the Table given below. Further, the comparison was made between the case where the filter bags were used and the case where no filter bag was employed. Amount of $H_2S$ gas generated after 10 hours and 50 hours from starting of the operation was measured at the portion intermediate of the stored liquid feed-in pipe 12, respectively, and without removing precipitate clogged in the filter. Further, the evaporating rate of the gas after 10 hours and 50 hours from starting of the operation was determined. The heat-applying capacity of the evaporating means was 2KW/cm$^2$ and the amount of the circulated liquid was 5 lit./min. The results are as shown in Table 1.

TABLE 1

| Diameter of filter opening (μm) | Concentration of H$_2$S gas (ppm) | | Evaporating rate (L/hr) | |
|---|---|---|---|---|
| | After 10 hrs. | After 50 hrs. | After 10 hrs. | After 50 hrs. |
| 0.2 | 1 | 80 | 1.4 | 1.2 |
| 0.5 | 1 | 85 | 1.4 | 1.2 |

TABLE 1-continued

| Diameter of filter opening (μm) | Concentration of H$_2$S gas (ppm) | | Evaporating rate (L/hr) | |
|---|---|---|---|---|
| | After 10 hrs. | After 50 hrs. | After 10 hrs. | After 50 hrs. |
| 1.0 | 1 | 6 | 1.4 | 1.3 |
| 5.0 | 1 | 1 | 1.4 | 1.4 |
| 10.0 | 1 | 1 | 1.4 | 1.4 |
| 20.0 | 1 | 1 | 1.4 | 1.4 |
| 50.0 | 2 | 2 | 1.4 | 1.4 |
| 100 | 4 | 3 | 1.4 | 1.4 |
| 200 | 8 | 5 | 1.4 | 1.3 |
| 300 | 35 | 40 | 1.3 | 1.2 |
| 500 | 30 | 45 | 1.3 | 1.2 |
| No filter was employed | 35 | 50 | 1.3 | 1.2 |

It is preferred that the concentration of $H_2S$ gas is as low as possible and the evaporating rate is as high as possible. Therefore, it can be seen that the filter having the opening diameter of 1 to 200 μm is preferably used.

[EXPERIMENT 2]

Next, in the treatment device, as shown in FIGS. 8 and 9, example wherein the centrifugal separating means shown in FIGS. 10 to 12 were applied are designated as Type A1, B1, C1 and A2, B2, and C2, respectively. Comparison of the concentration of $H_2S$ gas measured was made between the cases where the precipitate separating means was not employed and the cases where a filtration under pressure means by use of the filter was effected. The heat-applying capacity of the evaporating means was 2 KW/cm$^2$ and the amount of the circulated liquid was 5 lit./min.

TABLE 2

| | Concentration of H$_2$S in vapor (ppm) | Concentration of H$_2$S in vapor after 20 days from starting of the continuous operation (ppm) |
|---|---|---|
| No separation by filtration was effected | 4,000 | 6,000 |
| Filter | 0.2 | 100 |
| Type A1 | 0.2 | 0.6 |
| Type B1 | 0.05 | 0.3 |
| Type C1 | 0.1 | 0.4 |
| Type A2 | 0.1 | 0.5 |
| Type B2 | 0.1 | 0.4 |
| Type C2 | 0.1 | 0.5 |

It should be noted that the volume of precipitate to be separated by the filter and the centrifugal filtration means was 1 lit. It can be found that the generation of $H_2S$ gas can be reduced when the separation is effected in the case of the continuous operation by means of the centrifugal filtration.

Further, in the type B in which the centrifugal separating means shown in FIG. 11 is employed, when the valve 3 (not shown in this figure) was closed, and even after 1 to 2 minutes passed, the filter 72q became cold because it had been cooled by the rotation of the precipitate taking-out case 72o. Accordingly, the precipitate can easily be taken out favorably.

[EXPERIMENT 3]

The following experiments were carried out by using the above mixed waste liquor by means of the apparatus for treatment as shown in FIG. 13 wherein the precipitating tank having a thread-like obstacle made of polypropylene having a diameter of about 0.5 mm therein was employed (referred to as thread-like obstacle in Table), and also by means of apparatus for treatment as shown in FIG. 11 wherein the precipitating tank having an obstacle composed of plates was employed (referred to as plate-like obstacle in Table), and concentration of $H_2S$ gas generated was measured. The measurement of the concentration of the $H_2S$ gas generated was carried out at the portion where vapor was discharged from the cooling means. In the apparatuses of FIG. 2 and FIG. 3, the heat-applying capacity of the evaporating means were each 2 $KW/cm^2$ and the amount of the circulated liquid were each 5 lit./min. Plate-like obstacles were made of polypropylene resin and had a thickness of 5 mm. Spacing between the obstacles were each 30 mm.

The results are shown in Table 3.

As the comparative purpose, experiments were conducted similarly in the apparatus for treatment where the precipitating tank was not employed (referred to as "no precipitating tank" in Table) to measure the concentration of the $H_2S$ gas generated. The results are also shown in Table 3.

TABLE 3

| | Concentration of $H_2S$ gas | | |
|---|---|---|---|
| | No precipitating tank (Comparative ex.) | Thread-like obstacle (This invention) | Plate-like obstacle (This invention) |
| After 1 hr. from starting of operation | 87 ppm | 2 ppm | 2 ppm |
| After 20 hrs. from starting of operation | 90 ppm | 2 ppm | 2 ppm |
| After 50 hrs. from starting of operation | 95 ppm | 2 ppm | 2 ppm |

It is preferred that the concentration of $H_2S$ gas generated is as low as possible. Accordingly, it can be seen from the above Table that the precipitate can effectively be taken out from the concentrated liquid by separation to be effected by means of the obstacle provided in the precipitating tank and that the odor gas can effectively be reduced thereby.

[EXPERIMENT 4]

Experiments were carried out similarly to the above Experiment 3 by using the above mixed waste liquor except that the precipitating tanks was replaced with those as shown in FIGS. 15 to 18. In the following Table, "FIG. 15", "FIG. 16", "FIG. 17" and "FIG. 18" mean the cases where precipitating tanks as shown in FIG. 15, FIG. 16, FIG. 17 and FIG. 18 were employed, respectively.

The results are shown in Table 4.

TABLE 4

Figure 15:
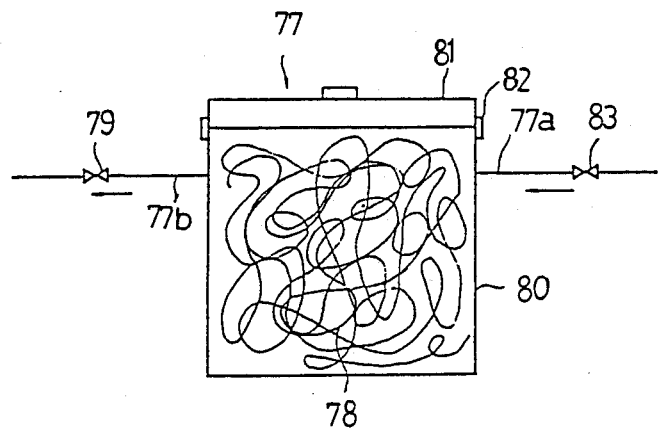
FIGS. 15 to 18 are schematical views showing other examples of precipitating tanks.

| | Concentration of $H_2S$ gas | | | |
|---|---|---|---|---|
| | FIG. 15 | FIG. 16 | FIG. 17 | FIG. 18 |
| After 1 hr. from starting of operation | 2 ppm | 2 ppm | 2 ppm | 2 ppm |
| After 20 hr. from starting of operation | 2 ppm | 2 ppm | 2 ppm | 3 ppm |
| After 50 hrs. from starting of operation | 2 ppm | 10 ppm | 10 ppm | 18 ppm |

TABLE 4-continued

| | Concentration of $H_2S$ gas | | | |
|---|---|---|---|---|
| | FIG. 15 | FIG. 16 | FIG. 17 | FIG. 18 |

From the above results, it can be seen that the concentration of $H_2S$ gas can be reduced in all cases. Particularly, the precipitating tank shown in FIG. 15 is preferred. Further, the precipitating tank as shown in FIGS. 15 and 16 can give good operability since they are provided with neither lid, feeding section nor taking-out section to prevent hands from staining with the waste liquor. Particularly, the precipitating tank as shown in FIG. 15 is provided with the feeding section and the taking-out section at the upper portion of the vessel, thereby the operability was simplified.

[EXPERIMENT 5]

Experiments were carried out by using the above mixed waste liquor in the respective cases where the taking-out section 1b of the evaporation vessel 1 in the apparatus for treatment as shown in FIG. 19 was naturally cooled and the taking out section 1b of the evaporation vessel 1 in the apparatus for treatment as shown in FIG. 20 was forcedly cooled.

Figure 27:
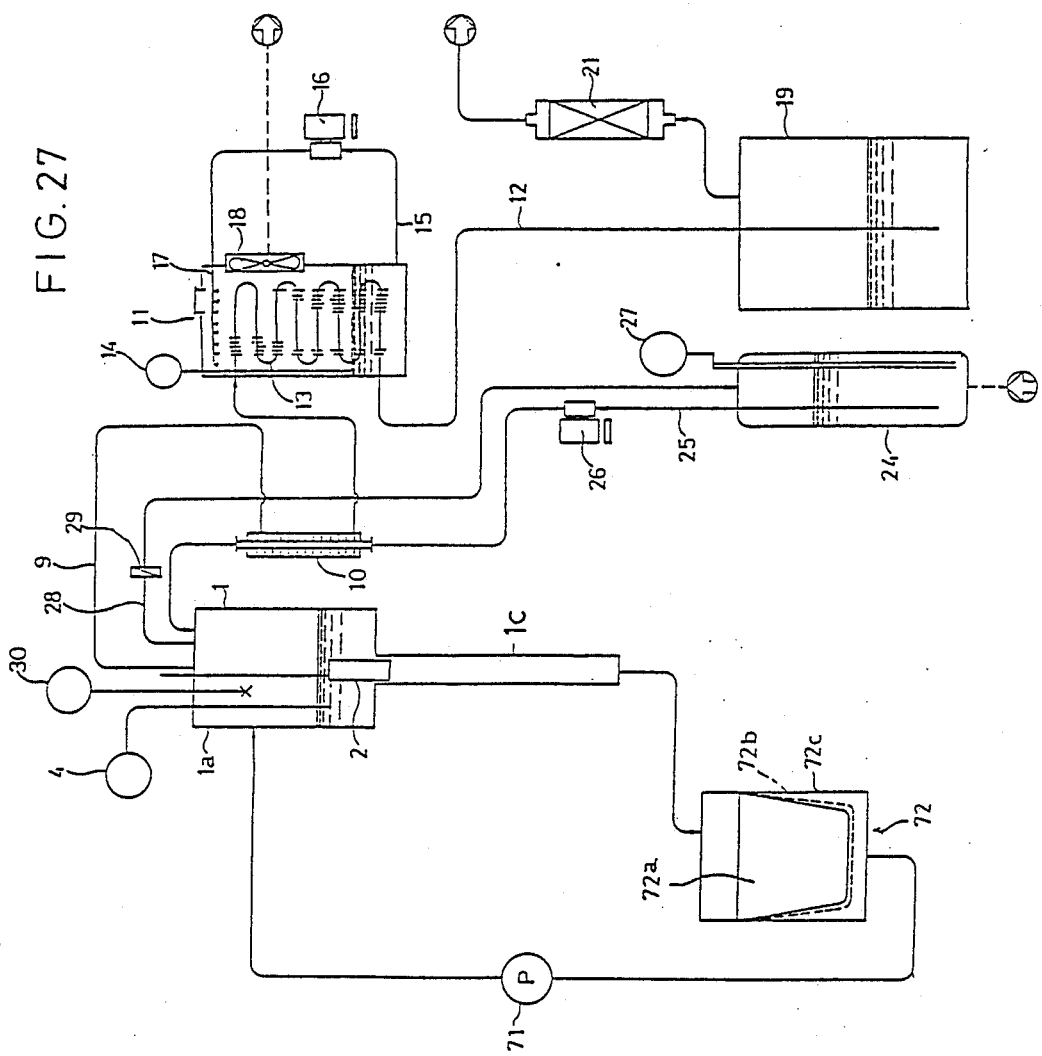
FIG. 27 is a schematical explanatory view of an example of the apparatus for treating photographic process waste liquor used for the purpose of comparative examples.

As the comparative purpose, the similar experiment was carried out by using the apparatus for treatment as shown in FIG. 27. The bottom section of the evaporation vessel 1 of the comparaive example is designed to have the same sectional area as that of the upper section 1a, and the concentrated liquid is taken out from the lower section 1b to the circulation system 70 directly.

The concentration of $H_2S$ gas generated after 30 hours and 100 hours from starting of the operation was measured, respectively, at the portion intermediate in the stored liquid lead-in pipe 12.

The results of the measurement are shown in Table 5.

TABLE 5

| | Concentration of $H_2S$ gas | | |
|---|---|---|---|
| | No cooling (This invention) | Natural cooling (This invention) | Forced cooling (This invention) |
| After 30 hrs. from starting of the operation | 3 ppm | 1 ppm | 0 |
| After 100 hrs. from starting of the operation | 15 ppm | 2 ppm | 0 |

It is preferred that the concentration of $H_2S$ gas is as low as possible. As can be seen from the above Table, when the concentrated liquid is naturally cooled at the taking-out section 1b of the evaporation vessel 1 of the apparatus for treatment, generation of the odor gas can further be reduced. Moreover, when the concentrated liquid is forcedly cooled, generation of the odor gas can more further by reduced.

As described heretofore, in the apparatus for treating the photographic process waste liquor according to this invention, there is provided a taking-out section whose sectional area becomes smaller successively to the evaporating means, from which the concentrated liquid to be produced through concentration by evaporation is taken out. There is also provided the circulation system in the apparatus by which the concentrated liquid is to be conveyed again to the evaporating means through the precipitate separating means. Accordingly, the photographic process waste liquid is heated at the heating means to effect concentration by evaporation, and the concentrated liquid produced is cooled at the taking-out section having a smaller sectional area in the evaporating means to accelerate separation of the precipitate from the concentrated liquid. The thus formed precipitate is further guided to the taking-out section with the concentrated liquid to be discharged smoothly and securely. The deposition of the precipitate is reduced at the taking-out section by virtue of the taking-out of the concentrated liquid. Accordingly, the precipitate formed through concentration by evaporation is not stayed in the vicinity of the heating means, and consequently the decomposition by excess heating by the heating means can be prevented to inhibit effectively the generation of the odor gas.

We claim:

1. An apparatus for treating a photographic process waste liquid comprising an evaporating means wherein the photographic process waste liquor is concentrated by evaporation;

heating means for heating said waste liquor with the formation of a precipitate;

a precipitate separating means for separating the precipitate from the concentrated waste liquor;

a circulation system to feed the concentrated waste liquor through the precipitate separating means and thereafter return said concentrated waste liquor to the evaporating means; and a discharging means for discharging the precipitate separated at said precipitate separating means from said precipitate separating means;

wherein the evaporating means is provided with a taper-shaped section for immediate removal of precipitate so that thermal decomposition of the precipitate and generation of undesirable odors is avoided.

2. The apparatus for treating a photographic process waste liquor according to claim 1, further comprising a waste liquor feeding tank provided posterior to the precipitate separating means and the concentrated waste liquor is allowed to circulate to the evaporating means through the waste liquor feeding tank.

3. The apparatus for treating a photographic process waste liquor according to claim 1, wherein the precipitate separating means is operable to remove precipitate which has a diameter of at least 1 $\mu$m.

4. The apparatus for treating a photographic process waste liquor according to claim 1, wherein the precipitate separating means is composed of at least one of a filtration under pressure means and a centrifugal filtration means.

5. The apparatus for treating a photographic process waste liquor according to claim 1, wherein the precipitate separating means is a precipitating tank having an obstacle therein.

6. The apparatus for treating a photographic process waste liquor according to claim 5, wherein the circulation system further comprises means for feeding the concentrated waste liquor horizontally to the precipitating tank.

7. The apparatus for treating a photographic process waste liquor according to claim 5, wherein the circulation system comprises means for removing the concentrated waste liquor from the precipitating tank, horizontally.

8. The apparatus for treating a photographic process waste liquor according to claim 1, wherein a means for cooling forcedly the taper-shaped section of the evaporating means is provided.

9. The apparatus for treating a photographic process waste liquid according to claim 8, wherein the means for cooling is a heat exchange means coupled to the taper-shaped section of the evaporating means and using the photographic process waste liquor being fed to the evaporating means to remove heat from the heat exchange means.

* * * * *